(12) United States Patent
Tägtström et al.

(10) Patent No.: US 12,682,336 B2
(45) Date of Patent: Jul. 14, 2026

(54) PAY BY PLATE

(71) Applicant: Alimentation Couche-Tard Inc., Laval (CA)

(72) Inventors: Karl Magnus Tägtström, Montreal (CA); Claudio Cardoso Saiki, Montreal (CA)

(73) Assignee: Alimentation Couche-Tard Inc., Laval (CA)

( * ) Notice: Subject to any disclaimer, the term of this patent is extended or adjusted under 35 U.S.C. 154(b) by 812 days.

(21) Appl. No.: 17/862,129

(22) Filed: Jul. 11, 2022

(65) Prior Publication Data

US 2023/0009904 A1 Jan. 12, 2023

Related U.S. Application Data

(60) Provisional application No. 63/220,205, filed on Jul. 9, 2021.

(51) Int. Cl.
| | |
|---|---|
| *G06Q 20/32* | (2012.01) |
| *G06V 20/58* | (2022.01) |
| *G06V 20/62* | (2022.01) |
| *G07F 13/02* | (2006.01) |
| *H04W 4/021* | (2018.01) |

(52) U.S. Cl.
CPC ......... *G06Q 20/3224* (2013.01); *G06V 20/58* (2022.01); *G06V 20/625* (2022.01); *H04W 4/021* (2013.01); *G07F 13/025* (2013.01)

(58) Field of Classification Search
CPC .. G06Q 20/3224; G06V 20/58; G06V 20/625; G06V 20/52; H04W 4/021; G07F 13/025; G07F 15/001
See application file for complete search history.

(56) References Cited

U.S. PATENT DOCUMENTS

| | | | |
|---|---|---|---|
| 10,360,647 B2 * | 7/2019 | Pallas | ...................... B67D 7/34 |
| 10,504,094 B1 * | 12/2019 | Gaudin | .................. G06Q 20/36 |
| 10,579,988 B2 * | 3/2020 | Betancourt | ........ G06Q 20/3224 |
| 2015/0242969 A1 * | 8/2015 | Pallas | .................... B67D 7/145 |
| | | | 705/39 |
| 2016/0035013 A1 * | 2/2016 | Plattenburg | ........ G06Q 30/0641 |
| | | | 705/27.1 |
| 2017/0243410 A1 * | 8/2017 | Caballero | .............. G07C 5/008 |
| 2019/0106317 A1 | 4/2019 | Sahota et al. | |
| 2020/0226584 A1 | 7/2020 | Nawoj | |
| 2020/0307988 A1 | 10/2020 | Braslavsky et al. | |
| 2021/0253112 A1 * | 8/2021 | McFarland, Jr. | ... B60W 40/105 |

* cited by examiner

*Primary Examiner* — Michael Collins
(74) *Attorney, Agent, or Firm* — Merchant & Gould, P.C.

(57) ABSTRACT

Systems and methods for streamlined vehicle fueling and payment are provided. In an example, the present disclosure is directed to an automated, seamless payment system for use at a gas station or convenience store. In particular, the application is related to a payment system for use at a pay at pump arrangement that does not require the user to provide a specific payment method at the time of the gas pump use.

20 Claims, 17 Drawing Sheets

100

301

450

Review Your Info

301

402
404
406
408
410
412

Notifications

CUSTOMIZED OFFERS

EMAIL NOTIFICATIONS

TEXT NOTIFICATIONS

SILENT PUSH
NOTIFICATIONS

PUSH NOTIFICATIONS

LOCATION PERMISSIONS

400

CAMERA VIEW 604

PUMP C

606

608

600

CAMERA VIEW 602

PUMP C

PUMP D

PUMP A

PUMP B

REGION C

REGION D

REGION A

REGION B

606

600

301

1050

301

1100B

Transaction Complete!

Details:
July 7, 2021
Ottawa, ON
$35.20 (10.2 L)
Payment:
Amex (ending in X0000)

1100A

Authorize Transaction
Location:
Ottawa, ON
Couche-Tard
Pump 4
License Plate: XXX-XXXX
Time: 10:40 AM Approve!

1300

Detect customer at station

1302

Customer account?

1304

YES

NO

Provide display at pump for customer account creation

1306

Streamlined fueling enabled for customer account?

1308

YES

NO

Customer account a candidate for automated enrollment?

1310

NO

Traditional fueling

1312

YES

Enroll customer account for streamlined fueling

1314

Streamlined Fueling

1316

1402

Recognize vehicle is stopped for fueling

1420

↓

Identify vehicle license plate

1422

↓

Lookup license plate in database

1424

↓

Traditional fueling

1428

← NO — Is the license plate associated with a customer? 1426 — YES →

↓

NO ← Is customer's device in a geofence associated with the station? 1430 → YES

↓                                                          ↓

To Operation 1406                                          To Operation 1408

PAY BY PLATE

CROSS-REFERENCE TO RELATED APPLICATIONS

The present application claims priority from U.S. Provisional Patent Application No. 63/220,205, filed on Jul. 9, 2021, the disclosure of which is hereby incorporated by reference in its entirety.

BACKGROUND

Customer payments at gas stations or convenience stores require hands-on interaction of a user. For example, at a gas station, a customer that desires to fuel their vehicle must first provide a method of payment prior to fueling. Additionally, after fueling, a customer is asked if a payment receipt is desired.

It is with respect to these and other general considerations that the aspects disclosed herein have been made. Also, although relatively specific problems may be discussed herein, it should be understood that the examples should not be limited to solving the specific problems identified in the background or elsewhere in this disclosure.

SUMMARY

Examples of the present disclosure describe systems and methods for streamlined vehicle fueling and payment. In an example, the method for streamlined vehicle fueling and payment includes detecting that a vehicle is in proximity to a fuel pump of a fuel station, identifying vehicle information associated with the vehicle, and, based on the vehicle information, determining that the vehicle is associated with a customer account. The method also includes requesting secondary authorization to unlock the fuel pump, the secondary authorization including: determining a geolocation of a device associated with the customer account; and comparing the geolocation of the device with a geofence associated with the fuel station. The method also includes, based on obtaining the secondary authorization, unlocking the fuel pump.

In a further example aspect, a method for streamlined vehicle fueling and payment is disclosed. The method includes detecting that a vehicle is in proximity to a fuel pump of a fuel station. The method also includes identifying vehicle information associated with the vehicle. Based on the vehicle information, the method includes determining that the vehicle is associated with a customer account. Additionally, the method includes determining a geolocation of a device associated with the customer account and comparing the geolocation of the device with a geofence associated with the fuel station. Based on the geolocation of the device being located inside of the geofence associated with the fuel station, the method includes unlocking the fuel pump.

In a further example aspect, the method further includes: determining that the fuel pump is no longer in use for the vehicle; locking the fuel pump; and sending a transaction receipt to the customer account. In another example, the vehicle information is selected from the group consisting of: a license plate number; a color of the vehicle; a make of the vehicle; and a model of the vehicle. In a further example, the vehicle information is a license plate number. In yet another example, determining that the vehicle is associated with a customer account includes a lookup of the license plate number in a customer database. In still a further example, the device is a mobile phone. In another example, based on the geolocation of the device being located inside of the geofence associated with the fuel station and the customer account being a preexisting customer account, the unlocking of the fuel pump does not require user interaction with the fuel pump, or, in some instances, the customer account.

In another aspect, a method for streamlined vehicle fueling and payment is disclosed. The method includes detecting that a vehicle is in proximity to a fuel pump of a fuel station. The method also includes identifying vehicle information associated with the vehicle. Based on the vehicle information, the method includes determining that the vehicle is associated with a customer account. Additionally, the method includes determining a geolocation of a device associated with the customer account and comparing the geolocation of the device with a geofence associated with the fuel station. Based on the geolocation of the device being located outside of the geofence associated with the fuel station, the method includes sending an authorization request to the customer account. Further, the method includes receiving a remote authorization via the customer account. Based on receiving the remote authorization, the method includes unlocking the fuel pump at the fuel station.

In yet another aspect, a system includes a fuel station comprising a plurality of fuel pumps, and a camera network having a plurality of cameras positioned at the fuel station, each camera having a field of view, wherein, within the field of view of each of one or more of the plurality of cameras, a region is defined corresponding to a vehicle position in association with a predetermined one of the plurality of fuel pumps. The system further includes a geolocation service defining a geofence in a vicinity of the fuel station, and a customer profile database maintained in communicative connection with the camera, the customer profile database storing customer account information associated with a plurality of customer accounts, the customer account information including payment information and vehicle information, the vehicle information including at least a license plate number associated with a vehicle. The system further includes a fueling control system including a streamlined fueling controller and at least one content controller. The fueling control system is configured to: determine, from the camera network that a vehicle is in proximity to a fuel pump of a fuel station; identify vehicle information associated with the vehicle; based on the vehicle information, determining that the vehicle is associated with a customer account maintained in the customer profile database; request secondary authorization to unlock the fuel pump, the secondary authorization including at least one of (1) confirmation of a geolocation of a device associated with the customer account within the geofence at the fuel station, or (2) an authorization received from a customer associated with the customer account; based on obtaining the secondary authorization, unlock the fuel pump without requiring user interaction with the fuel pump; after unlocking the fuel pump, providing personalized content to the fuel pump for display on a display of the fuel pump based, at least in part, on information associated with the customer account; and upon completion of a fueling transaction, providing a transaction receipt for authorized fueling of the vehicle at the fuel station.

In an example, the authorization request includes the vehicle information and identifies the fuel station. In another example, the vehicle information is a license plate number of the vehicle. In a further example, the customer account includes payment information. In yet another example, the method further includes: determining that the vehicle has moved outside of the proximity of the fuel pump; locking the fuel pump; and sending a transaction receipt to the customer account. In still a further example, unlocking the fuel pump includes allowing fuel to be provided to the vehicle via the fuel pump at the fuel station. In another example, the device is a mobile device.

In a further aspect, a method for streamlined vehicle fueling and payment is disclosed. The method includes associating vehicle information for a vehicle with a customer account. The method also includes receiving a location request for a device associated with the customer account. Additionally, the method includes obtaining a geolocation of the device and comparing the geolocation of the device with a geofence of a fuel station at which the vehicle has been identified based on the vehicle information. The method further includes determining that fueling of the vehicle at the fuel station is authorized by the customer account. The method also includes providing a transaction receipt for the authorized fueling of the vehicle at the fuel station.

In an example, determining that fueling of the vehicle at the fuel station is authorized by the customer account includes determining that the geolocation of the device is inside of the geofence of the fuel station. In another example, determining that fueling of the vehicle at the fuel station is authorized by the customer account includes: providing an authorization request to the customer account; and receiving a remote authorization for the customer account at the device. In a further example, the vehicle information is a license plate of the vehicle. In yet another example, associating the vehicle information for a vehicle includes receiving the vehicle information at the customer account. In still a further example, the transaction receipt includes a payment amount and identifies the fuel station.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
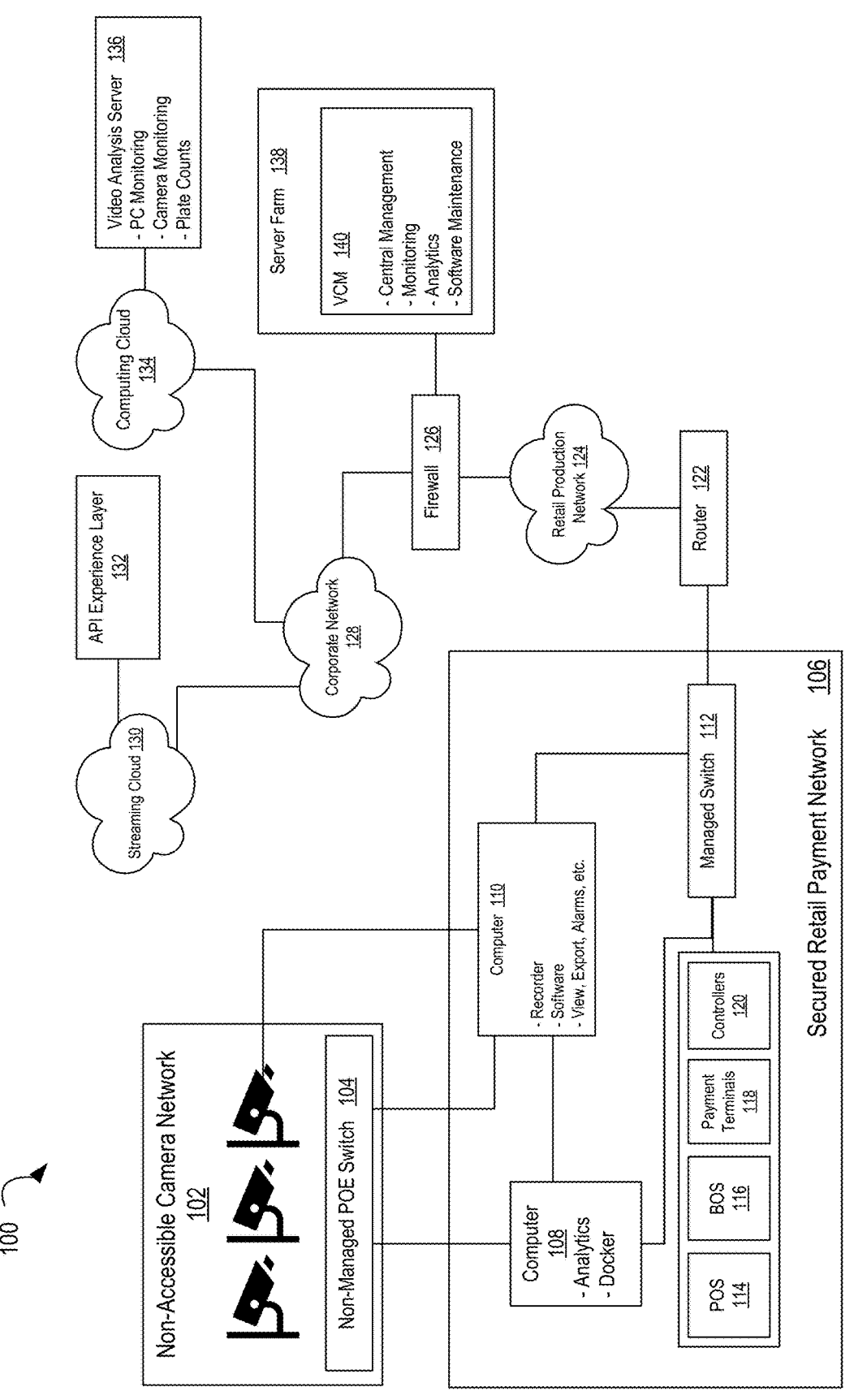
FIG. 1 depicts an example system for streamlined vehicle fueling and payment.

Customer payments at gas stations or convenience stores require hands-on interaction of a user. For example, at a gas station, a customer that desires to fuel their vehicle must first provide a method of payment prior to fueling. Additionally, after fueling, a customer is asked if a payment receipt is desired.

The present technology provides systems and methods for improved or streamlined vehicle fueling and payment. In an example, the present disclosure is directed to an automated, seamless payment system for use at a gas station or convenience store. In particular, the application is related to a payment system for use at a pay at pump arrangement that does not require the user to provide a specific payment method at the time of the gas pump use.

Existing security cameras at a gas station may be used to determine a vehicle's proximity to a fuel pump at a station, to determine if the vehicle is stopped for fueling, and to identify a license plate and/or other features of a vehicle. For example, the cameras provide a feed of image data. Individual vehicles within the image data are recognized. Recognition of a vehicle may include determining that a vehicle is located within a bounding box of the image data and/or by drawing a bounding box around the vehicle in the image data. Image analysis may be performed on the portion of the vehicle to determine vehicle information. The vehicle information may include a color, make, model, and/or existence of a number plate (otherwise referred to herein as a license plate) of the vehicle. An existing number plate may be recognized (e.g., the character sequence on the number plate may be determined via image recognition algorithm(s)). One or more components of the vehicle information is used to identify a particular user associated with the vehicle. In an example, one user is associated with a given vehicle at a given time. Alternatively, more than one user may be associated with a given vehicle.

Upon identification of the user associated with a given vehicle, a location assessment is performed to determine if a device of the user (e.g., mobile phone, laptop, or other movable or mobile computing device) is detected in proximity to the vehicle (e.g., based on a geo-fenced area around the gas/service station). If the user is in proximity to the vehicle, the pump at which the vehicle is located can be unlocked without user intervention or action, to allow the user to initiate fueling. Upon completion of the fueling, the user may drive away from the station without user intervention or action (e.g., without providing payment or indicating delivery of a receipt), because existing, valid payment methods are prestored as associated with the user.

If the user is not in proximity to the vehicle or station, the pump at which the vehicle is located may be unlocked after the user is sent a notification at their device and responds authorizing unlocking of the pump to allow for refueling of the vehicle (e.g., a remote action by the user associated with the vehicle). Alternatively, a user at the pump could provide a payment mechanism directly at the station or pump.

If a user's device is in proximity to the vehicle or station, or the user provides remote authorization of fueling via their device, a payment mechanism is identified. Additionally, loyalty or rewards of the user may also be applied. The user may view any payments in an application running on their device.

The time between the vehicle arriving at a pump and the pump being authorized for the vehicle based on a user's proximity to the vehicle (e.g., when the user's device is inside of a geo-fenced area associated with the station) can be less than or equal to 15 seconds. Accordingly, this solution streamlines the vehicle fueling payment process. Additionally, this reduces or prevents delays in payment charges resulting from station-based payments (e.g., where a user is required to intervene or take action at a pump or station to provide a payment method). For example, delays in user gas/service station charges in Illinois and California have been recorded to take days or weeks.

The present solution also guarantees Payment Card Industry Data Security Standard (PCI-DSS) compliance by using a specific payment regime (e.g., using Adyen® payment service provider (PSP)). Additionally, the present solution may use a cookie ID (CKID) database that is GDRP compliant. Any recordings may also be made compliant with local legislation by protecting any closed-circuit television or video surveillance (CCTV). CCTV footage is processed on-site, no images are transferred over network to any cloud. Additionally, the CCTV footage is maintained under a strict usage policy. When identifying any number plates, recognized character sequences are sent over a network using Transport Layer Security (TLS) encryption and authentication. The number plates that are stored for lookup in a database are stored only after a user accepts a service terms of use agreement. The number plates are not stored in any persistent storage, including logs. Automatic plate recognition is not designed to cause any automatic behavior that can be dangerous for customer.

The present solution also protects against fraud. For example, if a fake number plate is determined, the station may refuse service. Additionally, the present technology may cross-check a number plate against other vehicle information (e.g., color, make, model, etc.) that may be registered for use with a payment service. For example, service may be refused where a detected number plate is not consistent with the other vehicle information previously registered or otherwise associated with the number plate. Additionally, fraud may be prevented by determining that the user's device is in a geo-fenced area of the station (e.g., using GPS coordinates) or requiring the user's manual authorization of the transaction, as otherwise described herein. Stolen credit card or payment information or hijacked/stolen CKID tokens may also be reduced or prevented by verifying an identity of a device or application running on a device. Other advantages are appreciated.

FIG. 1 depicts an on-site system 100 (e.g., a system located at a gas/service station) for streamlined vehicle fueling and payment. As shown, the system 100 includes a non-accessible camera network 102 with a non-managed POE switch 104, a secured retail payment network 106, a router 122, a retail production network 124, a firewall 126, a corporate network 128, a streaming cloud 130 (e.g., an NGRP® or SMIL® cloud), an API experience layer 132, a computing cloud 134 (e.g., AWS® cloud), a video analysis server 136, and a server farm 138 (e.g., DXC® server farm). The secured retail payment network 106 may include one or more computers 108, 110, a managed switch 112, a point-of-sale (POS) system 114, a back office system 116 (BOS), a payment terminal 118, and one or more controllers 120.

Hardware components that may be new or added to an existing station system may include a CCTV solution that includes an internet protocol (IP) camera and recorder and a computer to run or perform analytic software locally (e.g., InterPlay®). The on-site CCTV solution may leverage existing corporate CCTV technology. If a corporate CCTV solution is not pre-existing in the on-site system 100, then a minimum required corporate solution can be implemented on-site (e.g., using pump cameras and a 3× Logic Recorder).

As described herein, on-site camera video surveillance streams are not exposed to a station owner's retail production network 124 or payment network, nor is the stream accessible directly over a corporate network 128. One or more cameras are installed and configured on a private local area network (LAN), such as the non-accessible camera network 102, and are accessible through wired connection (e.g., RJ45 connection), for example through a dual network interface card (NIC) or through a computer running analytic software (e.g., the InterPlay server) introduced above. In example embodiments, camera streams are available through a real-time streaming protocol provided by the cameras, which is further made available for analytic software. The stream is accessible by user or pass that is unique per site (configured directly in the on-site camera(s)). A camera stream may be subject to a minimum quality; however, a resolution or image quality may be adjusted to reduce a burden on the analytic software assessing the stream.

In example embodiments, cameras on the non-accessible camera network 102 are connected to the secured retail payment network 106 either by a non-managed POE switch 104 or directly wired into a computer 110 that is a video or still image recorder. In some examples, the computer 110 may include a built-in POE switch. The analytics computer 108 is connected to the cameras on the non-accessible camera network via a wired connection to the non-managed POE switch 104 or directly to the recorder computer 110. The analytics computer 108 may include a dual NIC to enable a stable on-site connection and a stable connection to the secured retail payment network 106.

The analytics computer 108 may be a computer introduced to the on-site system 100 (e.g., may not be pre-existing in a traditional gas/service station). The analytics software running on the analytics computer 108 is capable of providing real-time analysis of video surveillance streaming from one or more cameras on the non-accessible camera network 102. The analytics software may recognize, identify, or otherwise detect vehicle information of a vehicle in a view of one or more cameras at the station, such as a license plate, color, make, model, etc. For example, a vehicle may be identified using object recognition software, which may generally be able to detect an object arriving within a field of view (or a predefined region of the field of view), and determine characteristics of that object (e.g., general size and shape) which may allow for object detection to identify the object as a vehicle. Additionally, particular characteristics of the vehicle, such as the license plate, color, make, and model may be determined as well, based on the image quality of an image from a camera, as well as the capabilities of the analytic software. Example analytic software may be able to detect a particular license plate state, as well as perform optical character recognition (OCR) on a vehicle license plate to uniquely identify a vehicle.

Based on the analytic capabilities in the software, the software can associate this vehicle information with a specific pump at the station and/or with a timestamp (e.g., via a RESTful application program interface (API) to the configured streaming cloud 130). The analytics software may analyze streams in real time so that the streams may not be recorded or stored locally. Thus, in an example, no images or video are transferred online. Additionally, the analytics computer 108 may run a container (e.g., such as in Docker®) to deploy and maintain updates. Software vendors do not have access to the container, and maintenance and support is provided through the on-site system 100 owner. Hardware components may include an Intel® Core™ i7-10700T (2.0 GHz base frequency, up to 4.5 GHz with Intel® Turbo Boost Technology, 16 MB L3 cache, 8 cores), 16 GB of memory, 250 GB of storage, two network ports (NIC), and capability of operating in an outdoor environment with variable weather (e.g., heat, dust, and humidity).

Camera health and viewing of any recording or stream can be enabled for monitoring and/or alarm purposes, among others. Monitoring of computer health (e.g., the health of the analytics computer 108 and/or recording computer 110) may be enabled by a provided vendor solution, and may use a dashboard (e.g., using a vendor such as AWS®, Kibana®, or Zabbix®). The usage of main components, CPU, and memory of one or more computers is monitored to determine health.

Figure 2:
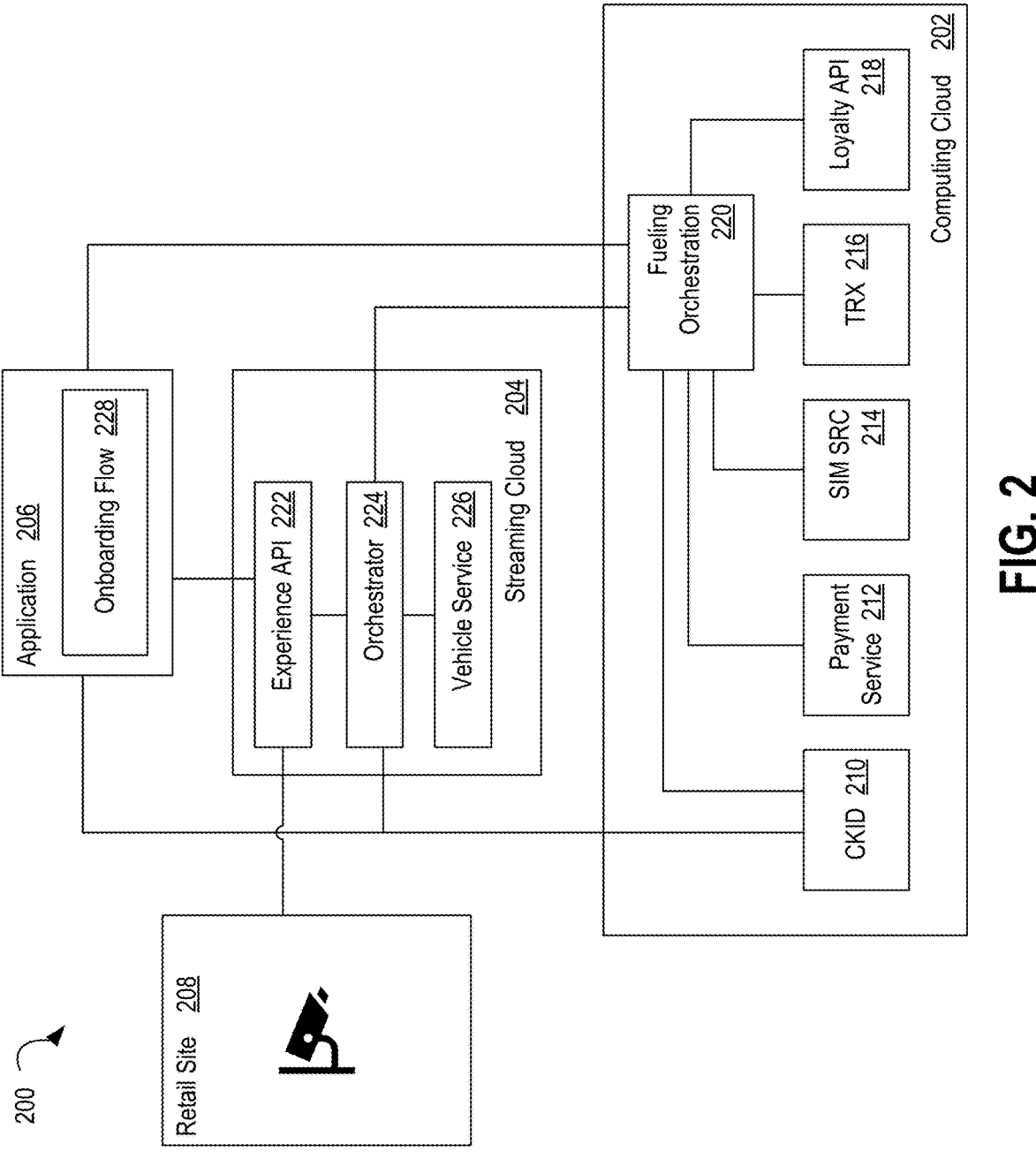
FIG. 2 depicts an example system for streamlined vehicle fueling and payment.

FIG. 2 depicts an application and back-end system 200 for streamlined vehicle fueling and payment, according to an example implementation. As shown, the system 200 includes a computing cloud 202 (e.g., AWS® cloud), a streaming cloud 204 (e.g., NGRP® cloud), an application 206, and a retail site 208. The computing cloud 202 (e.g., AWS® cloud) includes an identifier 210 (CKID 210), a payment service 212, a subscriber identification module (SIM) secure remote commerce (SRC) platform 214 (SIM SRC platform 214), a transaction service 216 (TRX 216), a loyalty API 218, and a fueling orchestration 220. The streaming cloud 204 (e.g., NGRP® Microsoft® Azure®) includes an experience API 222, an orchestrator 224, and a vehicle service 226. The application 206, which may be run on an Android, iOS, or any other platform, includes an onboarding flow 228. The retail site 208 may include one or more components described above in FIG. 1 with respect to the on-site system 100.

Figure 3A:
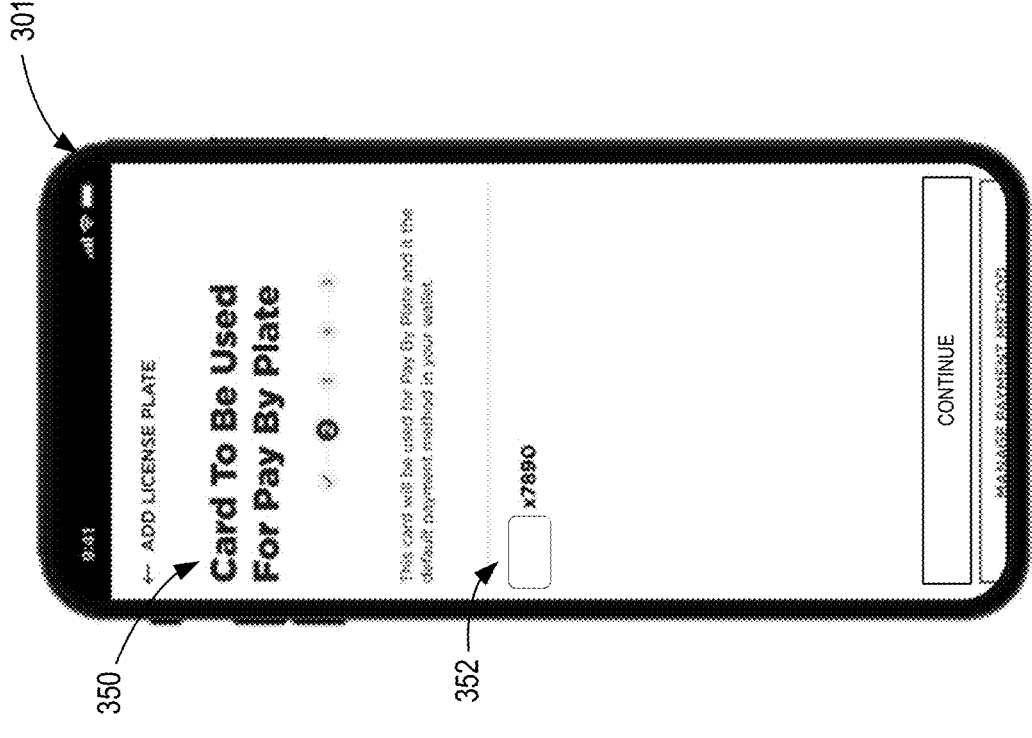
FIGS. 3A-3B depict example onboarding user interfaces of a mobile device for streamlined vehicle fueling and payment.
Figure 3B:
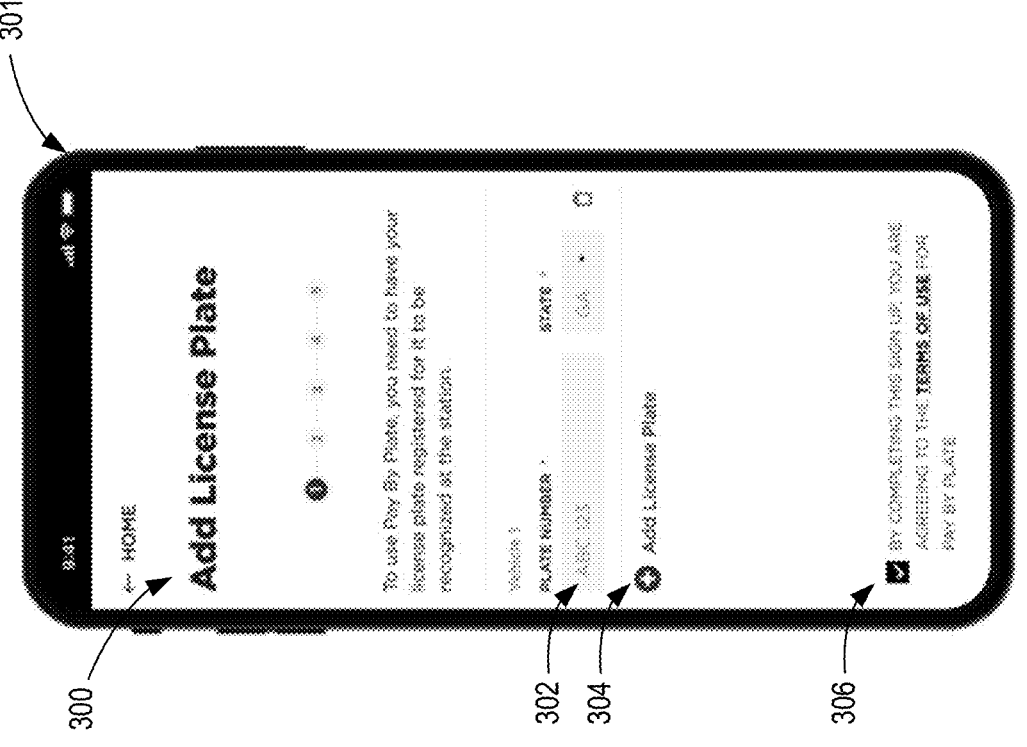

User interface flows are provided by the application 206 and back-end system 200, including onboarding, frictionless/streamlined fueling and payment, and manual fueling and payment. FIGS. 3A-3B depict example onboarding user interfaces 300/350 of a mobile device 301 for streamlined vehicle fueling and payment. In particular, FIG. 3A shows an add license plate user interface 300 including one or more vehicle information fields 302 to receive user input indicating a license plate number and a state/region which issued the license plate. In some embodiments, the vehicle information fields 302 may collect additional vehicle information such as color, make, model, etc. An add vehicle select element 304 may be provided to allow the user to add additional vehicles and/or license plates for association with the customer account. In addition to the customer providing data about their car, onboarding may include the customer selecting a terms element 306 to accept a terms of use or a terms of service agreement. FIG. 3B shows a payment information user interface 350 including a payment field 352 for entering credit card information and/or other types of billing information.

Figures 4A, 4B:
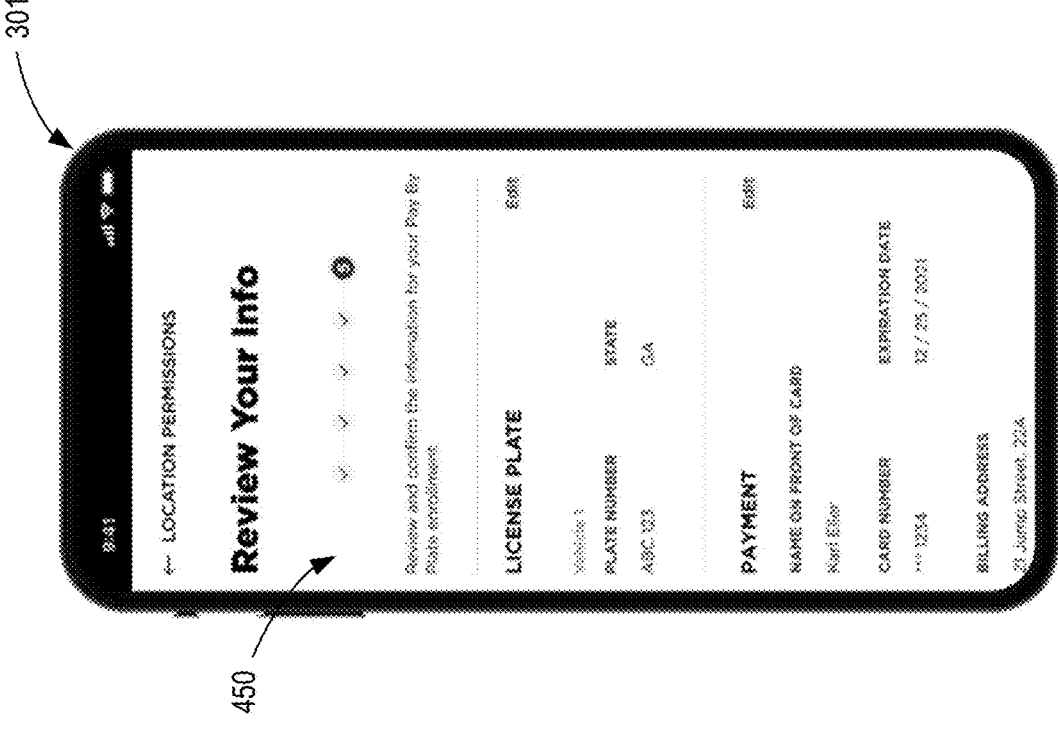
FIGS. 4A-4B depict additional example onboarding user interfaces of a mobile device for streamlined vehicle fueling and payment.

Onboarding may also include user selection of notification settings regarding the streamlined fueling process. FIGS. 4A-4B depict additional example onboarding user interfaces 400/450 of a mobile device 301 for streamlined vehicle fueling and payment. In particular, FIG. 4A shows a notification setting user interface 400 including selectable elements 402-412 to customize how the user associated with the account may receive notifications regarding the streamlined fueling process. For example, a customized offers element 402 may be selected to receive targeted advertisement content or personalized offers/rewards that are customized to the user based on their participation in streamlined fueling. The personalized content may be determined based on the user's activity at the pump and/or previous activity at station(s) managed by the operator. The personalized content may be provided to the user's device or pump for display where the user may interact with the content to collect or purchase additional items at the station.

Additional selectable elements may include an email notification element 404, text notification element 406, silent push notification element 408, and push notification element 410. As an example, by selecting the text notification element 406, the mobile device 301 associated with the user account can receive texts that automatically indicate or confirm one or more events of a streamlined fueling operation (e.g., confirmation that their license plate is detected and indication of which pump is unlocked). Activation of the silent push notification element 408 may allow delivery of notifications to the background of the application. For example, the application may be automatically activated without user interaction to provide/confirm a location of the mobile device 301 as part of a validation step during a streamlined fueling operation. In that regard, a location permission element 412 may be selected to allow the application to use one or more location features (e.g., GPS, Bluetooth®, etc.) of the mobile device 301. The push notification element 410 may be selected for receiving notifications which alert the user or prompt the user for input to continue a streamlined fueling operation. FIG. 4B shows an onboarding review user interface 450 displaying a summary of the user-entered information for confirmation. With the vehicle and payment information confirmed, onboarding may be completed and the user account enrolled for streamlined fueling.

Returning to FIG. 2, after onboarding, the vehicle service 226 creates an association between a vehicle (e.g., using the vehicle information) and customer CKID 210 via the orchestrator 224. A customer may decide to allow frictionless fueling (e.g., fueling without user intervention and/or fueling based on user authorization at the application) or not allow frictionless fueling. If the customer elects to not allow frictionless fueling, he or she may opt to provide payment or perform both manual fueling and payment directly at the station or pump. Frictionless/streamlined fueling and payment includes allowing fueling after recognizing a vehicle (e.g., based on vehicle information), determining a customer associated with the vehicle, and determining that the user has specified or allowed frictionless fueling and payment. After determining that frictionless fueling and payment is allowed by the user, one or more processes of the systems

100, 200 may be performed automatically, such as license plate recognition, pump authorization, payment, and receipt generation. Frictionless fueling may be performed using the fueling orchestration 220 and the orchestrator 224. Remote fueling and payment (e.g., when a user's device is not in a geo-fenced area of the station at which the vehicle is identified) may be performed using the fueling orchestration 220 and the application 206. Remote fueling and payment includes a user authorizing payment in the application 206. Manual fueling and payment (e.g., traditional payment directly at the station or pump) is allowed outside of the application 206.

The fueling orchestration 220 implements the fueling process (and other service processes, such as a car wash) for the payment service 212. The CKID 210 is the customer identity and authentication engine. The payment service 212 controls the payment process. The SIM SRC 214 performs pump/carwash authorizations and receives transaction finalizations. The transaction service 216 includes an engine that reconciles and settles transactions. The loyalty API 218 exposes loyalty engine capabilities (e.g., WM-CARD).

Figure 5:
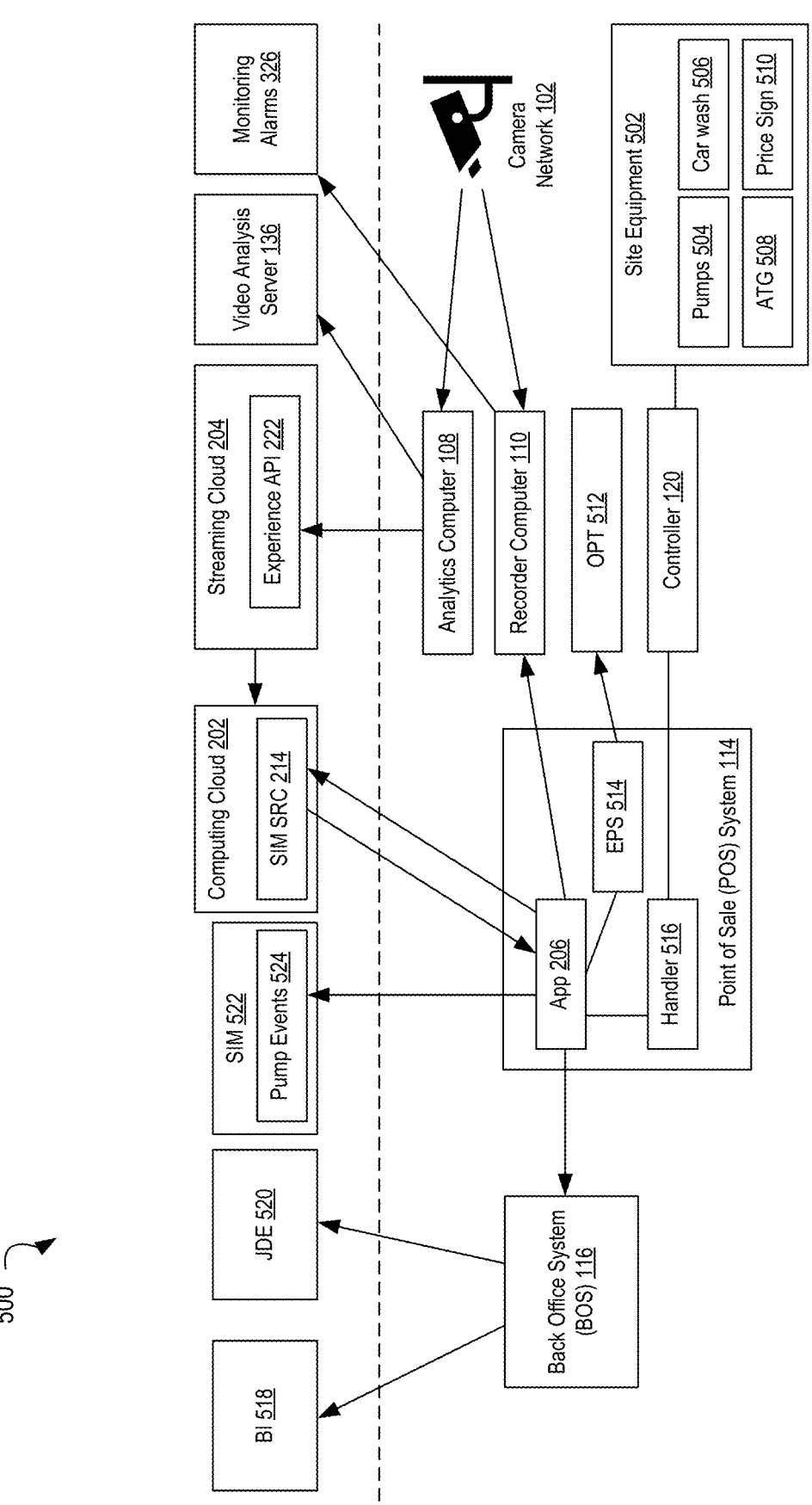
FIG. 5 depicts an example system for streamlined vehicle fueling and payment.

FIG. 5 depicts a backup system 500 for streamlined vehicle fueling and payment. As shown, the system 500 includes a video analysis server (e.g., server 136 of FIG. 1) that receives an image stream from the CCTV cameras (e.g., in camera network 102) and performs analysis on that video data, as described below. In examples, the server 136 receives camera views from analytics computer 108 in real time for purposes of that analysis. In some embodiments, the analytics computer 108 may perform at least a portion of the processing; for example, the analytics computer 108 may initially identify objects within video data and may then send captured object data to the server 136 for image recognition. In alternative embodiments, the entirety of the captured video data may be sent to the server 136.

In the example shown, the analytics computer 108 will send information to a streaming cloud 204. The information can include identification of a license plate and the pump number for the specific vehicle and pump 504 (e.g., a pump number, a pump letter, or other pump identifier) at which the vehicle is located. The experience API 222 may, in some examples, manage an experience of the user associated with the identified license plate. For example, the streaming cloud 204 can integrate with the computing cloud 202 to validate a location of a user mobile device associated with the license plate. If the user mobile device is in vicinity of the pump 504 identified by the pump identifier the pump may be unlocked to allow the user to refuel without further interaction with an application on the mobile device. However, if the user mobile device is not in the vicinity of the pump, the user may be presented with a confirmation message on the mobile device via the application to confirm authorization to unlock the pump and allow refueling.

The computing cloud 202 will interact with a point-of-sale system 114 to complete a refueling transaction. The point-of-sale system 114 receives transaction events from a controller 120, which is interfaced to a variety of site (e.g., gas station, service station, or other retail station) equipment 502, such as pumps 504, a car wash 506, a jet wash, vapor recovery system, an automatic tank gauge 508 (ATG), a price sign 510, or various other systems available for use by customers. A handler 516 at the point-of-sale system 114 manages the event state and authorizes the use of the pump, while providing pump events 524 back to the point-of-sale application 206 for charging the customer. Pump events 524 may also be recorded in a SIM module 522, and transaction events may be recorded in a backend storage environment.

In example embodiments, a payment terminal (designated "OPT") 512 may be interfaced to the point-of-sale system 114, via payment service (EPS) 514. Additionally, the back office system 116 may provide reporting outputs to, e.g., a business intelligence ("BI") tool 518 or via a data interface, shown as JDE 520.

Figures 6A, 6B:
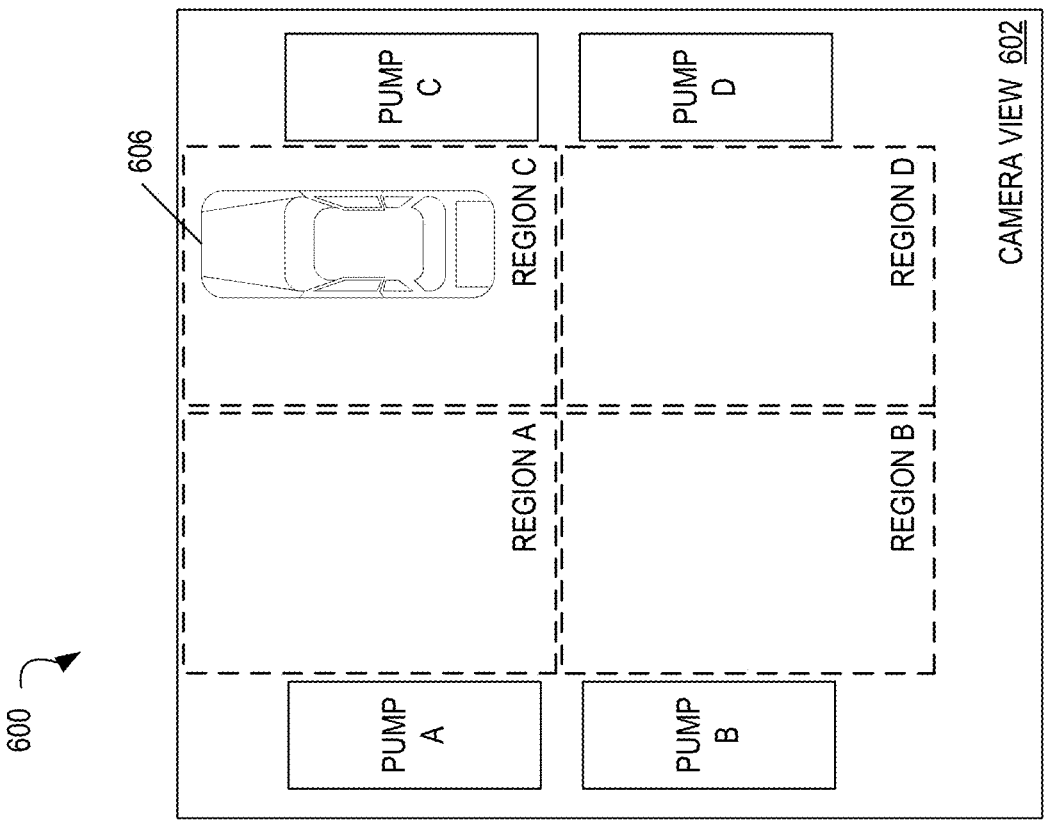
FIGS. 6A-6B depict views of a portions of a fueling station from two different camera views.

FIGS. 6A-6B depict views of a portions of a fueling station 600 from a first camera view 602 and a second camera view 604. As further described herein, one or more cameras (e.g., on non-accessible camera network 102 in FIG. 1) may be used to identify a position of a vehicle 606 at a station 600 along with vehicle information (e.g., color, make, model, license plate 608, etc.). As shown, a station 600 includes one or more pumps (e.g., Pump A, Pump B, Pump C, Pump D). A region may be associated with each pump (e.g., Region A associated with Pump A, Region B associated with Pump B, Region C associated with Pump C, Region D associated with Pump D). Although the regions are shown as rectangular in FIG. 6A, any shaped region is appreciated (e.g., circular, ovular, polygonal, etc.).

The camera views 602, 604 may be streamed to an analytics computer (e.g., analytics computer 108) in real time to analyze the camera views 602, 604. The analytics computer may determine if a vehicle 606 is stopped and positioned substantially in one of the regions associated with a pump at the station. A vehicle 606 may be determined to be stopped if the vehicle 406 does not move for a certain period of time. A vehicle 606 may be determined to be substantially in a region if more than half of the vehicle is contained within a single region. In the example shown in FIG. 6A, a vehicle 606 is wholly contained in Region C associated with Pump C of the station 600. If a vehicle 606 is substantially in a region, as determined by an analytics computer, the vehicle 606 may be associated with the pump associated with that region during the time the vehicle 606 is positioned substantially in the region. For example, a vehicle 606 may move between regions (e.g., move from Region C to Region A) and the vehicle's pump association is updated by the analytics computer, accordingly.

By associating a vehicle 606 with a pump, the systems and methods for streamlined fueling and payment can be implemented. In an example, a vehicle 606 is associated with Pump C. The vehicle 606 may be identified based on vehicle information identified by the analytics computer from one or more camera views 602, 604. If the vehicle is associated with a customer that uses frictionless fueling and payment or remote fueling and payment, Pump C may be unlocked accordingly (e.g., if frictionless and the device is in a geo-fenced area of the station or if remote and the user authorizes fueling and payment via an application, etc.). Although two camera views 602, 604 are shown in FIGS. 6A-6B, any number of cameras with any variety of views or view angles are appreciated to determine a position of a vehicle 606 and vehicle information, such as a license plate 608.

Figure 7:
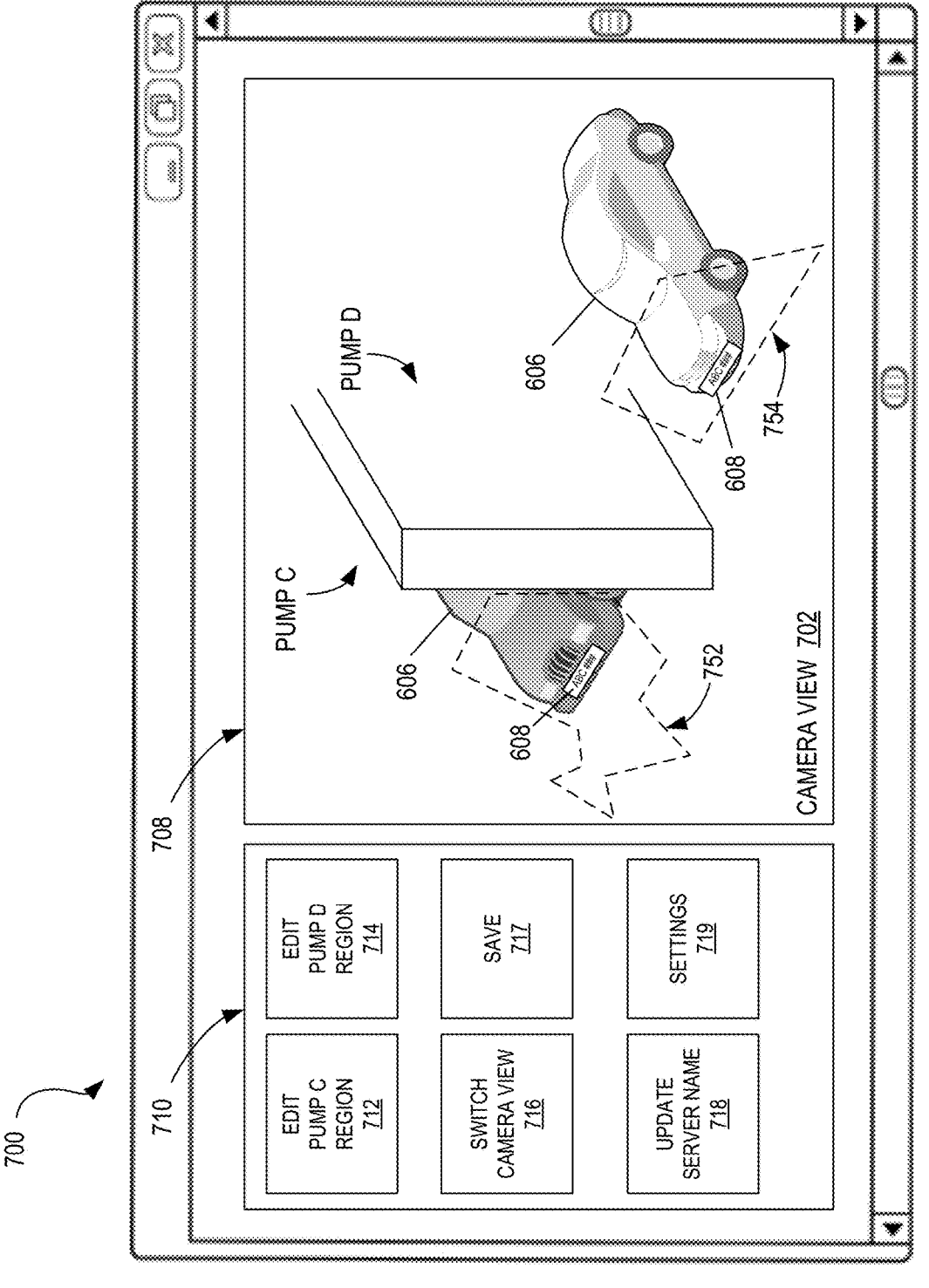
FIG. 7 depicts an example administrative user interface for setting up automatic license plate identification at a station.

FIG. 7 depicts an example administrative user interface 700 for setting up automatic license plate identification at a station. The administrative user interface 700 includes a camera window 708 displaying one or more camera views 702 of the station site. The administrative user interface 700 also includes a region edit window 710 with user-selectable options for identifying one or more regions of interest 752-754 of the camera view 702. The user-defined regions of interest 752-754 set in the administrative user interface 700 allow a station operator to optimize automatic license plate detection according to the unique features of the station and setup/location of its cameras.

In this example, the selected camera view 702 includes at least a partial view of a vehicle parking area for Pump C and Pump D. By selecting the Edit Pump C Region 712 of the region edit window 710, the user may draw or define a first region of interest 752 for Pump C and the selected camera view 702. Similarly, the Edit Pump D Region 714 updates the definition of a second region of interest 754 associated with Pump D and the selected camera view 702. The shape and size of each region of interest 752-754 may be uniquely set by the user such that the area inside the boundary is expected to overlap with a license plate 608 of a vehicle 606 parked for fueling at a particular pump (e.g., taking into account the selected camera view 702, expected variations in vehicle size, parking positions at the pump, etc.). Any of a variety of area selection tools may be used (e.g., selection of specific polygon shapes or freeform area definition via user input. Areas outside the boundary of the regions of interest 752-754 may therefore represent areas in which a license plate 608 of a vehicle 606 parked for fueling is not likely to appear or is obstructed in the camera view 702 by equipment or a structure of the station environment.

The region edit window 710 also includes a switch camera view option 716 to define or update the regions of interest of another camera point of view for the station. Each camera may have a unique angle or point of the view of the same or different fuel pump areas as compared to the view of other cameras and therefore have unique region(s) of interest set and associated therewith. After selecting a save option 717 in the region edit window 710, the region(s) of interest for one or more multiple pumps within the displayed camera view are defined for image processing (e.g., analysis performed by analytics computer 108) for license plate detection. The region edit window 710 may also include an update server name option 718 and settings options 719 for further station customizations. By defining regions of interest for each camera view of the station through the administrative user interface 700, automatic license plate detection is performed faster and more efficiently for improved streamlined fueling. Additionally, to the extent a same license plate is detected within more than one camera view at the same time (e.g., cameras oriented toward a front and a rear side of a car), the multiple views may be used for validation, and improved confidence as to the presence of the particular vehicle.

Figure 8:
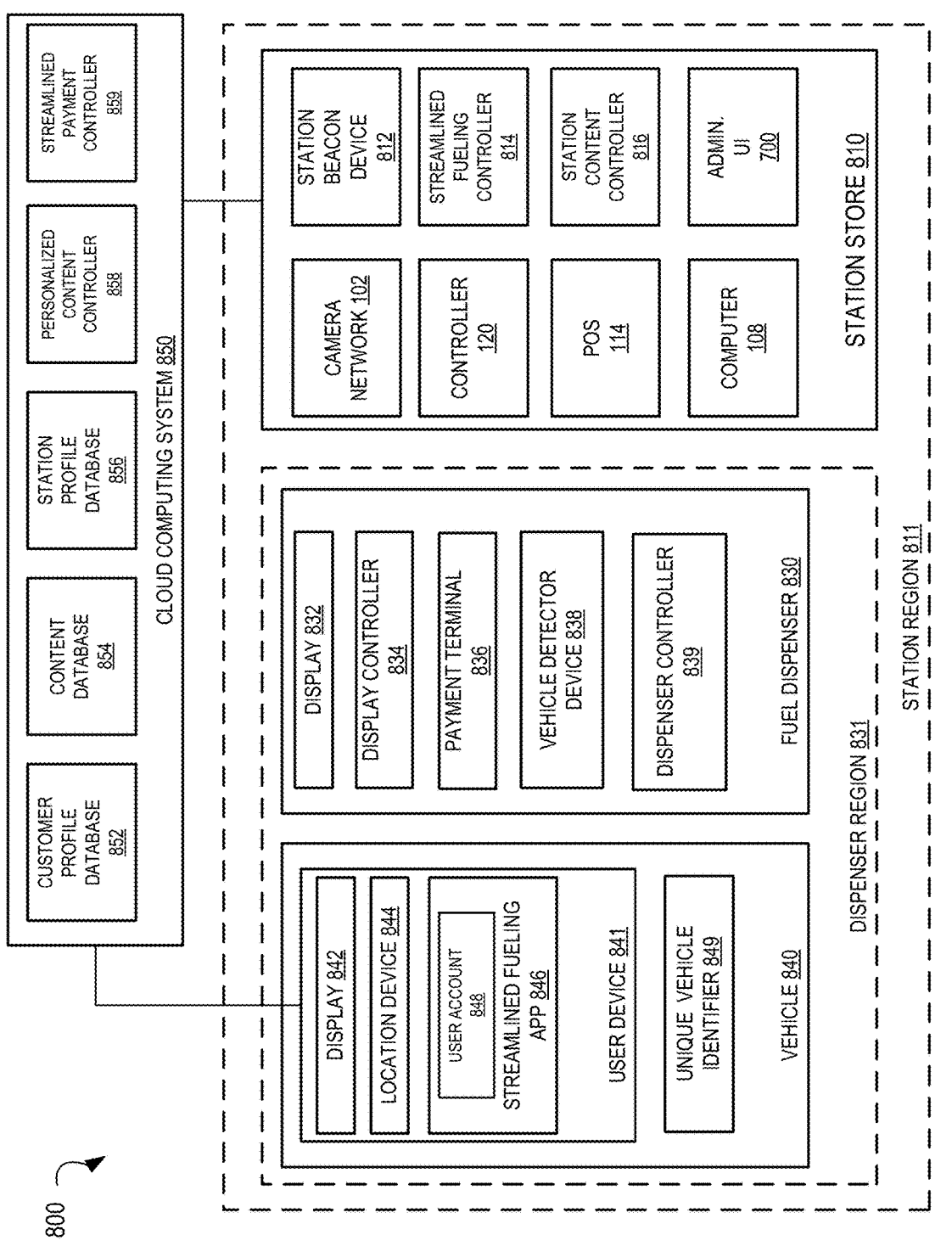
FIG. 8 depicts a block diagram of an example streamlined fueling system.

FIG. 8 depicts a block diagram of an example streamlined fueling system 800. The streamlined fueling system 800 includes a station store 810, one or more fuel dispensers 830, and a cloud computing system 850. As previously described, the station store 810 may include or be associated with various on-site equipment such as a camera network 102, controller(s) 120, and point-of-sale system 114. The analytics computer 108 may also be located on-site and implement the administrative user interface 700 or otherwise obtain image processing instructions set by the administrative user interface 700 from another computer device.

Additionally, the station store 810 may include a station beacon device 812 and a streamlined fueling controller 814 to enable streamlined fueling for a vehicle 840 at a fuel dispenser 830. The station beacon device 812 may comprise a transmitter device on the premises that continuously transmits signals (e.g., Bluetooth®, Ultra-Wideband (UWB), and/or RFID signals) that can be detected by mobile applications (e.g., streamlined fueling application 848 of user device 841) within a certain range. Therefore, in some embodiments, the signal range of the station beacon device 812 may define the station region 811 for detecting whether a user/vehicle is located within the station premises. Alternatively or additionally, the station region 811 may comprise a geofence or virtual boundary defined by GPS or RFID and integrated into the streamlined fueling application 848 of user device 841.

The user device 841 may include an on-board vehicle computer device or handheld device such as a smart phone inside the vehicle 840. Accordingly, the vehicle 840 or user device 841 therein may include a display 842, location device 844, and a streamlined fueling application 846 with a registered user account 848. In one embodiment, in response to detecting the vehicle 840 and/or user device 841 enters the station region 811, the streamlined fueling controller 814 and/or streamlined fueling application 846 may initiate one or more streamlined fueling operations described herein. For instance, the signal of the station beacon device 812 may trigger the streamlined fueling application 846 to initiate streamlined fueling by sending an account identifier to the streamlined fueling controller 814 and/or cloud computing system 850.

In one embodiment, the streamlined fueling controller 814 may use the camera network 102, analytics computer 108, and regions of interested defined by the administrative user interface 700 to detect one or more unique vehicle identifier(s) 849 located on the vehicle 408. The unique vehicle identifier 849 may comprise the license plate(s) of the vehicle 408. Alternatively or additionally, the unique vehicle identifier 849 may comprise a vehicle sticker having a visual feature or alphanumeric string that can be extracted through image analysis and authenticated through similar techniques as license plate detection described herein. In other embodiments, the unique vehicle identifier 849 may comprise an issued vehicle pass such as a toll road pass, having an identifier that is wirelessly obtained at the streamlined fueling controller 814 using RFID or similar technology installed at the station region 811. In some embodiments, one or more secondary vehicle identifiers (e.g., vehicle make/model or vehicle sticker) may be used to validate a primary vehicle identifier such as a license plate. Alternatively or additionally, an obtained account identifier and/or obtained location of the user/vehicle via location device 844 may be used to automatically validate the acquisition of a primary vehicle identifier and/or automatically authorize a streamlined fueling operation.

The streamlined fueling controller 814 may provide one or more identifiers including the obtained unique vehicle identifier 849, user account identifier, and/or station identifier to the cloud computing system 850 for account/payment validation. Alternatively or additionally, one or more such identifiers may be transmitted to the cloud computing system 850 by the streamlined fueling application 846 of the user device 841 in response to detecting presence within the station region 811. In either case, if the user account and/or its payment information is validated, the streamlined fueling controller 814 may unlock the appropriate fuel dispenser 830. Each fuel dispenser 830 may include a display 832, display controller 834, payment terminal 836, vehicle detector device 838, and dispenser controller 839. The appropriate fuel dispenser 830 may be determined through camera image analysis and/or the vehicle detector device 838 configured to detect the presence of the vehicle 840 within a dispenser region 831. For a streamlined fueling operation, the streamlined fueling controller 814 may direct the dispenser controller 839 to unlock the fuel dispenser 830 and allow fuel dispensing without user interaction with the payment terminal 836 or other aspect of the fuel dispenser 830. Additionally, in some embodiments, a mere presence of the user device 841 (having the streamlined fueling application 846 running in the background) within the station region 811 is sufficient, and streamlined fueling may be enabled without user interaction with the user device 841, and enabling the fuel dispenser may be enabled without direct interaction with the fuel dispenser 830 itself.

The streamlined fueling system 800 may also include functionality for providing personalized content to a user participating in a streamlined fueling operation. In that regard, the clouding computing system 850 may include a customer profile database 852, content database 854, station profile database 856, personalized content controller 858, and streamlined payment controller 859. The streamlined payment controller 859 is configured to validate a user for a streamlined fueling operation by performing a lookup in the customer profile database 852 using one or more obtained identifiers described above. The personalized content controller 858 is configured to determine and retrieve content from the content database 854 that is customized to the user based on their customer profile. The personalized content controller 858 may also retrieve personalized content based in part on data tracked in the station profile database 856 for the station being visited.

Figure 9:
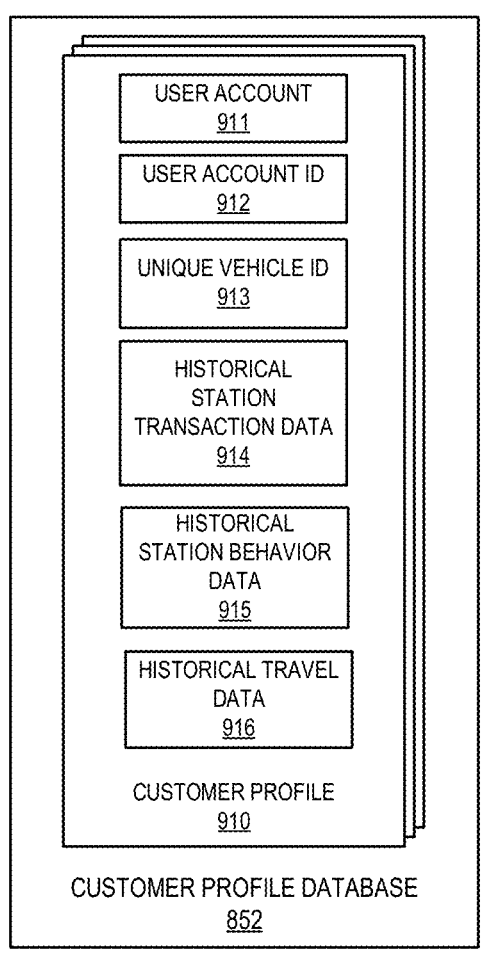
FIG. 9 depicts a block diagram of a customer profile database in accordance with some embodiments.

FIG. 9 depicts a block diagram of the customer profile database 852 in accordance with some embodiments. The customer profile database 852 may maintain a plurality of customer profiles 910 for users of the streamlined fueling application 846. Each customer profile 910 may include and/or correlate a user account 911, user account identifier 912, unique vehicle identifier 913, historical station transaction data 914, historical station behavior data 915, and historical travel data 916. The historical station transaction data 914 may include data of items previously purchased by the user at a particular station. The historical station behavior data 915 may include data of user/vehicle behavior at a particular station such as an average length of time to fuel the vehicle, an indication of whether the user is likely to enter the station store, etc. The historical travel data 916 may include data indicating a travel distance and/or travel time between two or more stations.

Returning to FIG. 8, the personalized content controller 858 may identify the appropriate customer profile 910 of the customer profile database 852 and process one or more data items tracked therein to determine advertisement content and/or a personalized vendor offer from the content database 854 to provide to the user. The content may be provided to the display 842 of the user device 841 and/or the display 832 of the fuel dispenser 830 during fueling. For example, the personalized content controller 858 may provide the content to the station content controller 816 which instructs the display controller 834 of the fuel dispenser 830 to show the content during a fuel operation. Alternatively or additionally, the personalized content controller 858 may provide the content to the user device 841 via the streamlined fueling application 846 in conjunction with validating a streamlined fueling operation. Further details regarding example personalized content that may be presented via the display 832 of the fuel dispenser 830, or via a user device 841, are provided in copending U.S. patent application Ser. No. 16/821,325, the disclosure of which is hereby incorporated by reference in its entirety.

In the case of a personalized vendor offer, the personalized content may include an interactive element to receive user indication/confirmation to purchase or redeem the offer by selecting the interactive element from the display. In response to receiving such a selection from the user device 841, the streamlined payment controller 859 may complete the transaction by communicating the selection to the controller 120 and point-of-sale system 114 of the station store 810. In some embodiments, the selection may allow the user to retrieve their selected item(s) from the station store 810 without user interaction with the point-of-sale system 114 of the station store 810. In one embodiment, after validating the vehicle/user for streamlined fueling, the streamlined fueling controller 814 may operate with the camera network 102 to track user behavior within the station region 811 and allow seamless payment of retrieved items.

Figure 10B:
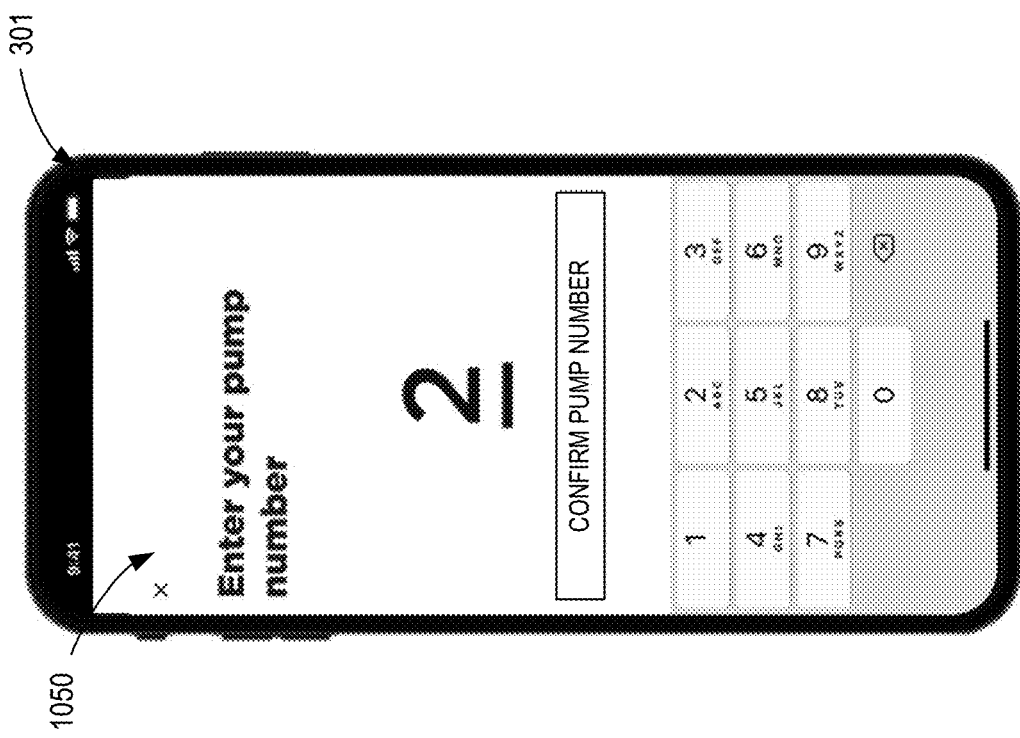
FIGS. 10A-10B depict additional example user interfaces of a mobile device for streamlined vehicle fueling and transaction.
Figure 10A:
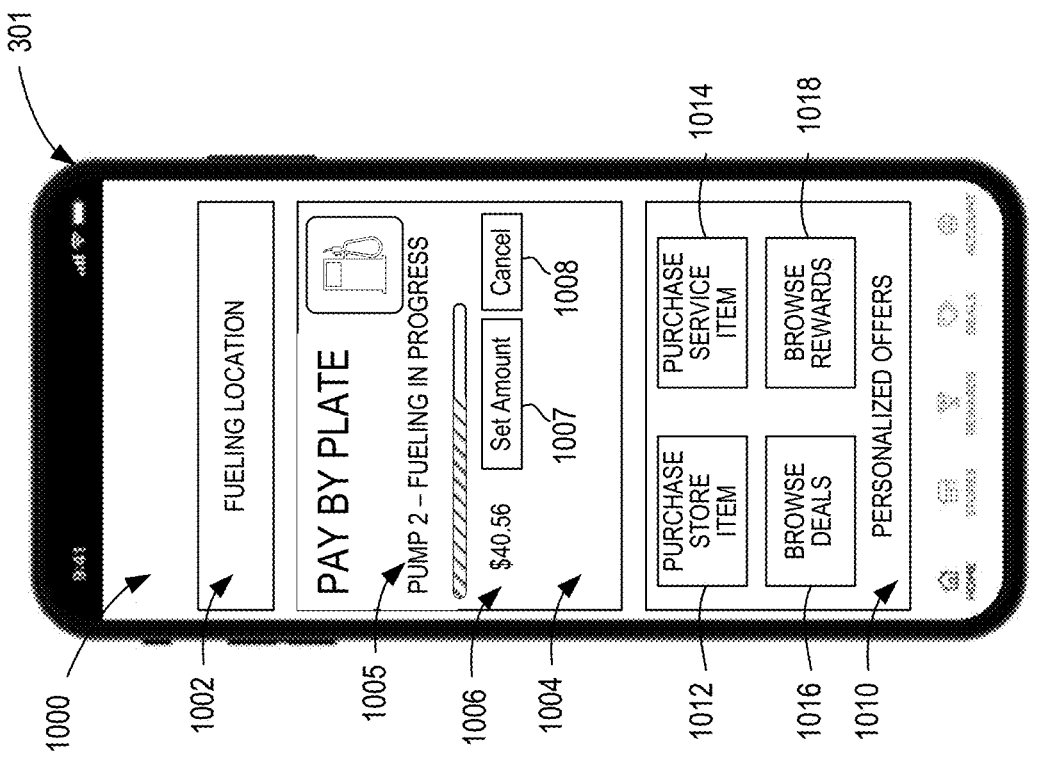

FIGS. 10A-10B depict additional example user interfaces 1000/1050 of a mobile device 301 for streamlined vehicle fueling and transaction. In particular, FIG. 10A shows a streamlined fueling user interface 1000 including a fueling location window 1002 displaying an address or location of the station, a fueling status window 1004, and a personalized offer window 1010. The fueling status window 1004 may display a pump indicator and fuel progress bar 1005, a current fuel purchase amount 1006, a purchase set amount option 1007, and a cancel fueling option 1008. The personalized offer window 1010 may display a purchase store item selectable element 1012, a purchase service item selectable element 1014, a browse store deals selectable element 1016, and a browse rewards selectable element 1018. FIG. 10B shows a manual confirmation user interface 1050 for streamlined fueling. The manual confirmation user interface 1050 may prompt the user to identify or validate the fuel dispenser to be used for streamlined fueling and payment.

Figure 11B:
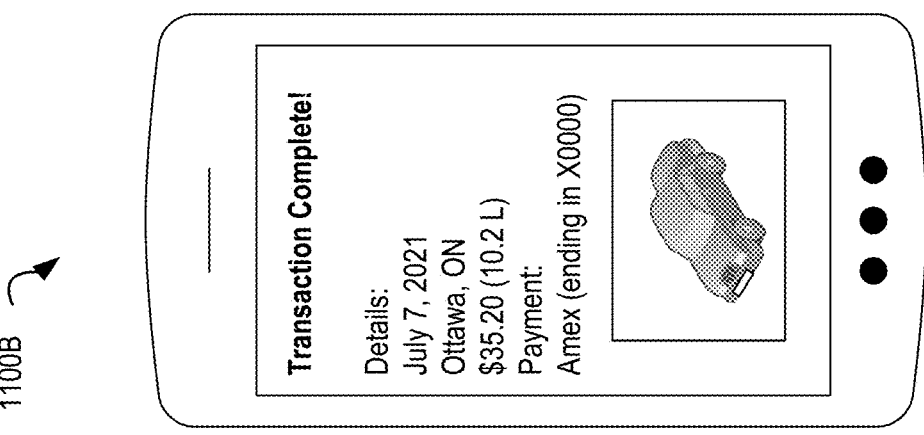
FIGS. 11A-11B depict example graphical user interfaces for streamlined vehicle fueling and payment.
Figure 11A:
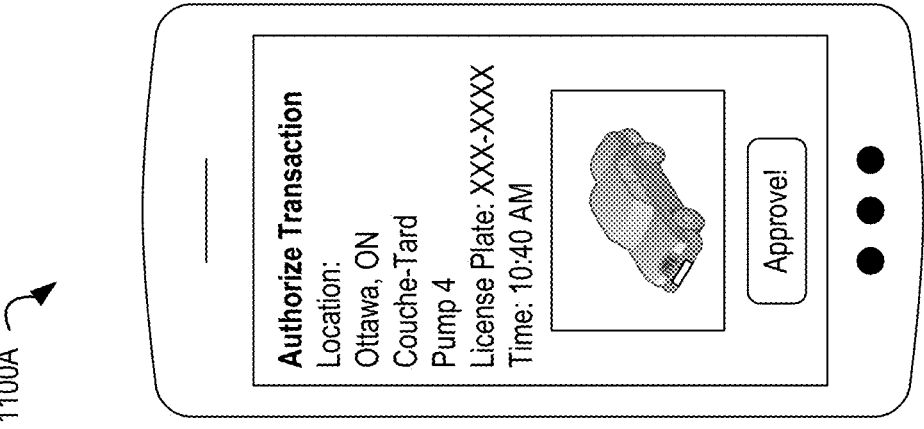

FIGS. 11A-11B depict example graphical user interfaces (GUI) for streamlined vehicle fueling and payment. Specifically, FIG. 11A shows an example GUI 1100A for remote authorization at a device outside of a geofence of a fuel station. FIG. 11B shows an example GUI 1100B for a transaction receipt for frictionless or remote fueling and payment, as further described herein.

In FIG. 11A, the GUI 1100A shows a remote authorization request. The remote authorization request may include vehicle information (e.g., license plate number, color, make, model, etc.). Additionally, the authorization request may identify the fuel station at which the vehicle is identified (e.g., by providing a location of the fuel station, such as city, address, name, etc.). The remote authorization request may also include other information regarding the impending transaction, such as time of request, pump associated with the vehicle at the fuel station (e.g., Pump 4), and payment information for the customer account currently on file. The GUI 1100A may also include a photo of the vehicle or other vehicle information. Additionally, the GUI 1100A may include a selectable user interface element for approving or denying the transaction. In an example, if the authorization request is not approved or denied within a time period of the request, the authorization request lapses and the request is automatically denied.

In FIG. 11B, the GUI 1100B shows a transaction receipt indicating that a transaction has been completed in association with the customer account. The GUI 1100B may include details associated with the completed transaction, such as date of transaction, time of transaction, location of the transaction (e.g., fuel station, pump at fuel station, city or state of fuel station, name of fuel station, etc.), price or total of the transaction, quantity of materials purchased or services purchased in the transaction, vehicle information, payment information, a photo of the vehicle, or any other information associated with the transaction. The transaction receipt GUI 1100B may also include user interface elements for customer forwarding of the transaction, printing of the transaction, etc.

Figure 12:
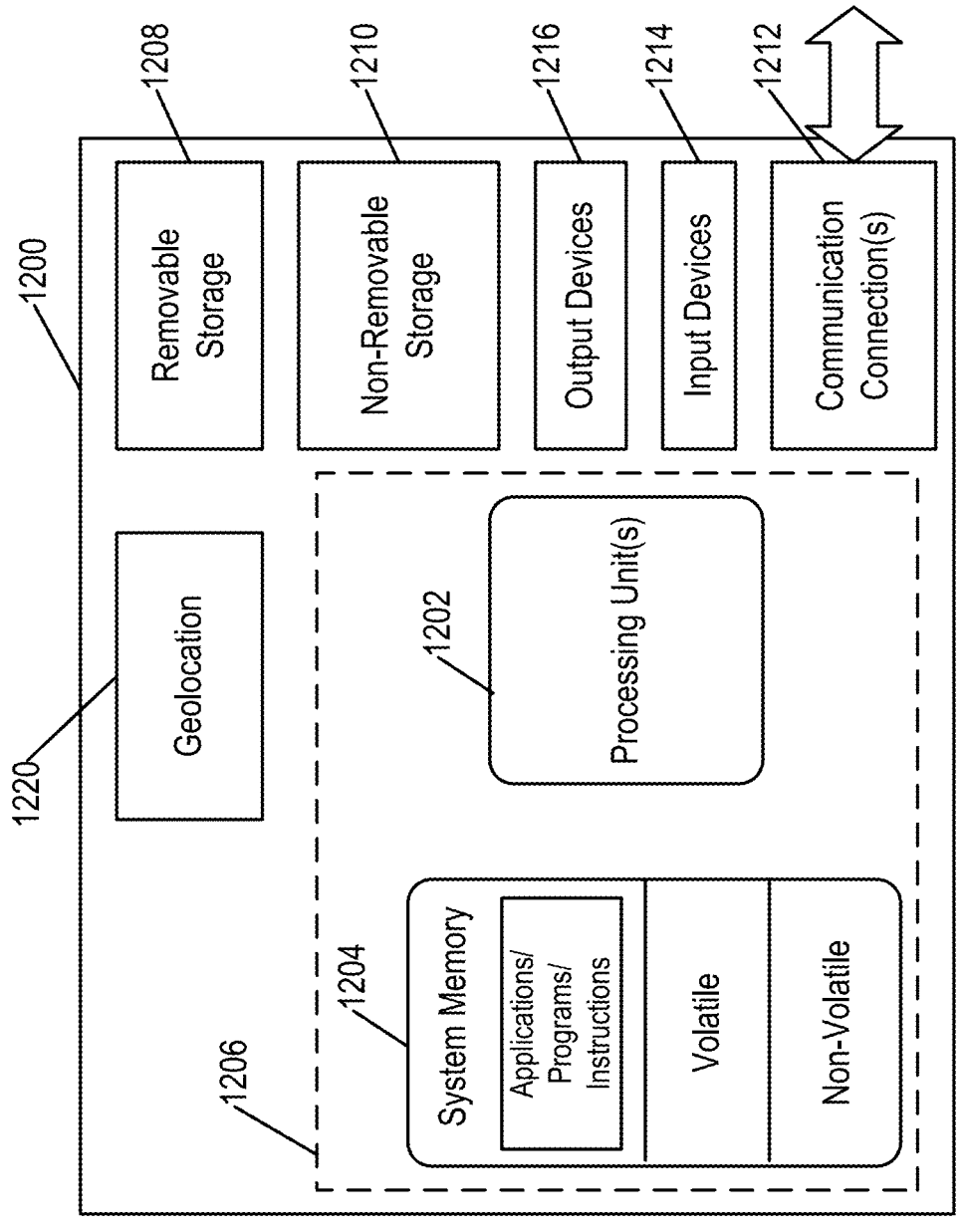
FIG. 12 depicts an example operating environment.

FIG. 12 depicts an example of a suitable operating environment 1200 that may be implemented by a client device, an on-site system 100 or server, an application or back-end system 200 or server, a backup system 300 or server, streamlined fueling system 800, and/or other computing devices within the systems discussed herein. In its most basic configuration, operating environment 1200 typically includes at least one processing unit 1202 and memory 1204. The processing unit may be a processor, which is hardware. Depending on the exact configuration and type of computing device, memory 1204 (storing instructions to perform the motion detection techniques disclosed herein) may be volatile (such as RAM), non-volatile (such as ROM, flash memory, etc.), or some combination of the two. This most basic configuration is illustrated in FIG. 12 by dashed line 1206. The memory 1204 stores instructions that, when executed by the processing unit(s) 1202, perform the processes and operations described herein, such as streamlined vehicle fueling and payment, etc. Further, environment 1200 may also include storage devices (removable 1208, and/or non-removable 1210) including, but not limited to, solid-state, magnetic disks, optical disks, or tape. Similarly, environment 1200 may also have input device(s) 1214 such as keyboard, mouse, pen, voice input, etc. and/or output device(s) 1216 such as a display, speakers, printer, etc. Additional communication connections 1212 may also be included that allow for further communication with LAN, WAN, point-to-point, etc. Operating environment 1200 may also include geolocation devices 520, such as a global positioning system (GPS) device.

Operating environment 1200 typically includes at least some form of computer readable media. Computer readable media can be any available media that can be accessed by processing unit 1202 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media is non-transitory and does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of the any of the above should also be included within the scope of computer readable media.

Figure 13:
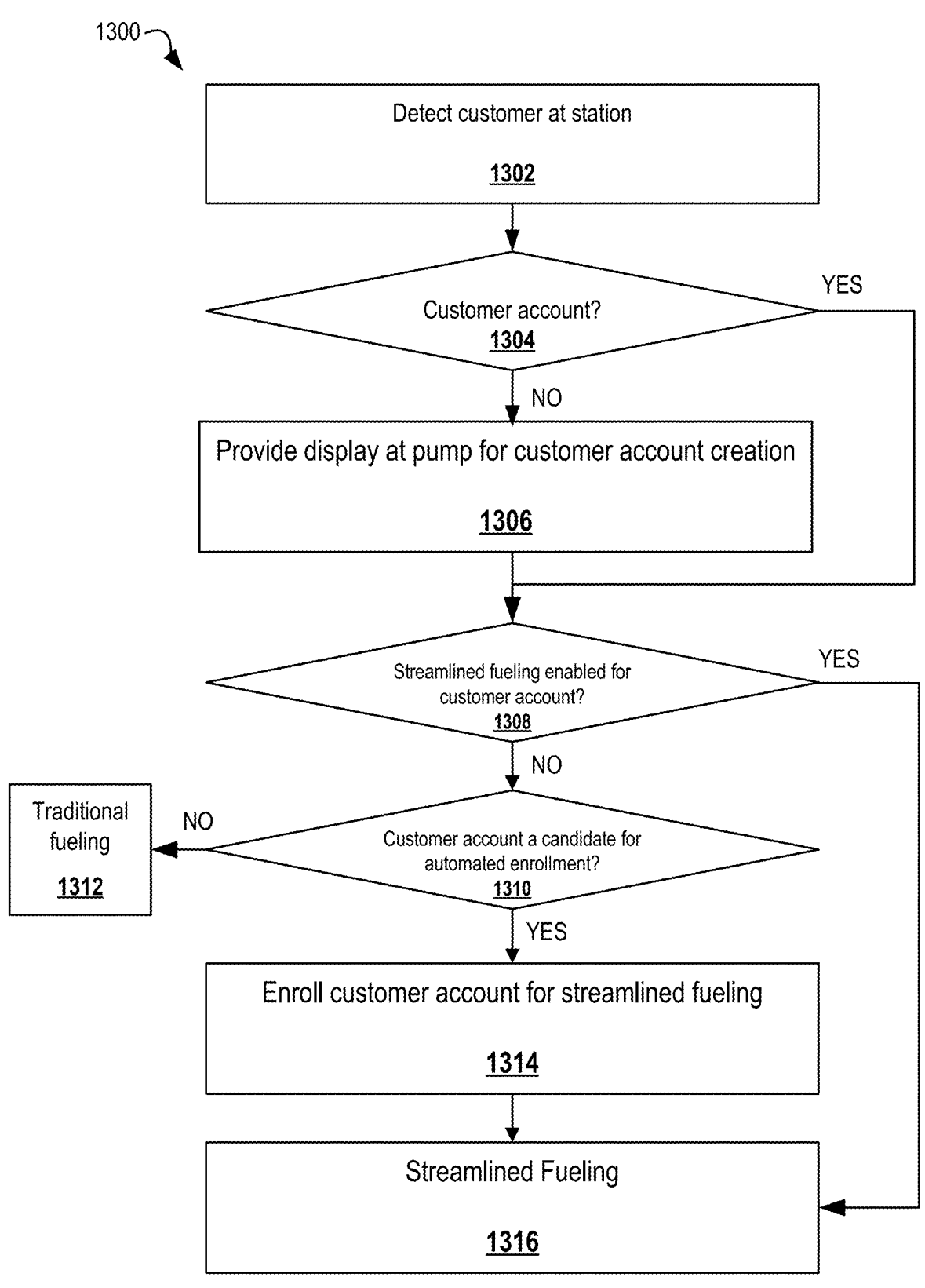
FIG. 13 depicts an example method of enrolling a user for streamlined vehicle fueling and payment.

FIG. 13 depicts an example method 1300 of enrolling a user for streamlined vehicle fueling and payment. At operation 1302, a customer is detected at a station. At operation 1304, it is determined whether a customer has an existing account. This determination may be performed using a license plate lookup operation. If so (e.g., Yes at operation 1304), the method 1300 proceeds to operation 1308. Otherwise (e.g., No at operation 1304), a display is provided at the fuel dispenser for customer account creation. For example, the display may include a link or QR code for downloading an app using the customer's mobile device. At operation 1308, it is determined whether streamlined fueling is enabled for the customer account. If so (e.g., Yes at operation 1308), the method 1300 may proceed to operation 1316 for streamlined fueling.

Otherwise (e.g., No at operation 1308), it is determined whether the customer account is a candidate for automated enrollment at operation 1310. For example, if the user device is on the station premises and the user account includes valid payment information, it may be considered a candidate for automated enrollment. Alternatively or additionally, the customer account may be determined to be a candidate for automatic enrollment if the user account includes an existing loyalty membership or the user/vehicle has previously visited the station or companion stations a predetermined threshold number of times. If the customer account is not a candidate for automated enrollment (e.g., No at operation 1310), the method 1300 proceeds to operation 1312 for traditional fueling. Otherwise (e.g., Yes at operation 1310), the method 1300 proceeds to operation 1314 to enroll the customer account for streamlined fueling. The enrollment may include automatic enrollment features such as automatically detecting the license plate number and associating it with the user account. Thereafter, the method 1300 may proceed to operation 1316 for streamlined fueling.

Figure 14A:
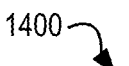
FIG. 14A depicts an example method for streamlined vehicle fueling and payment.
Figure 14A:
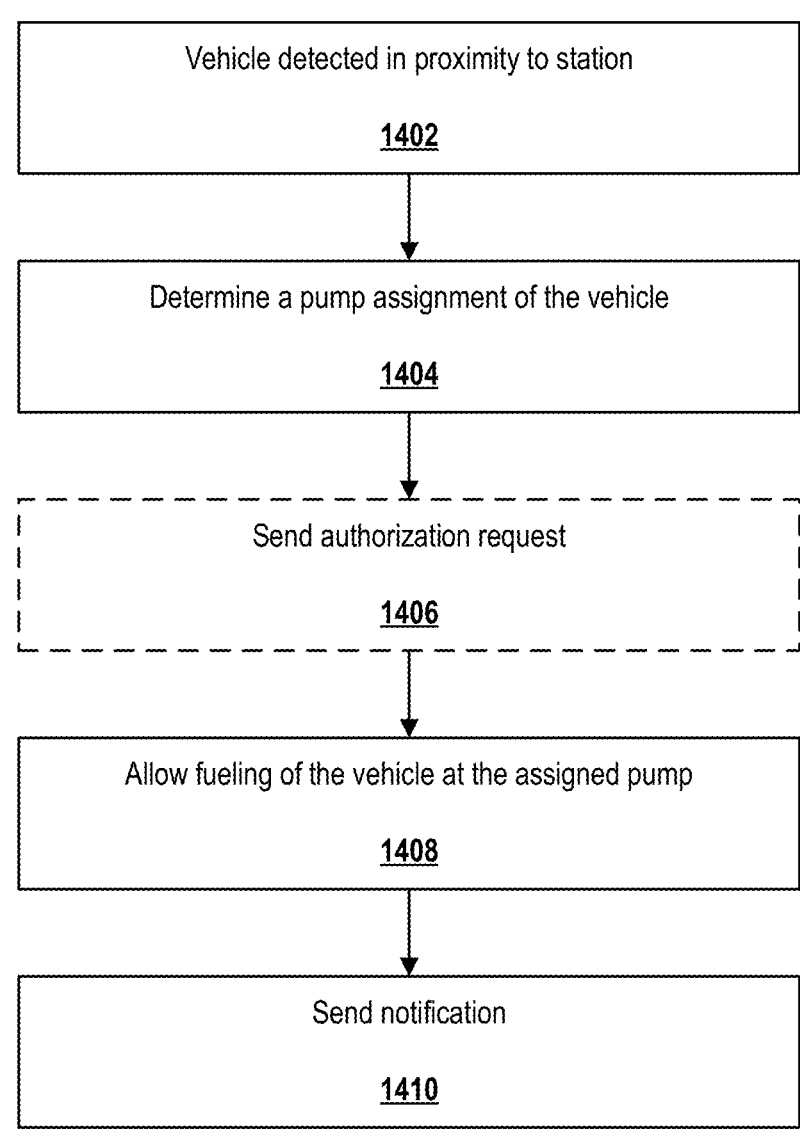

FIG. 14A depicts an example method 1400 for streamlined vehicle fueling and payment. At operation 1402, a vehicle is detected in proximity to a station. The vehicle may be detected using the systems described herein. For example, the vehicle may be detected based on real-time streaming data from one or more cameras at the station. The streaming data may be processed by video/image analysis software to identify a vehicle and vehicle information about the vehicle (e.g., license plate number, color, make, model, etc.). The station may be a fuel station, service station, or any other station with equipment associated with vehicles.

At operation 1404, a pump assignment of the vehicle is determined. The station may include one or more fuel pumps to fuel a vehicle. Assignment to a fuel pump may be based on proximity of the vehicle to one or more pumps. In an example, a region is associated with each pump. A position of the vehicle may be determined from one or more cameras, which may be the same or different from the cameras described with respect to operation 1402. The position of the vehicle (e.g., center of the vehicle, footprint of the vehicle, fuel tank cover of the vehicle, or any other component or shape of the vehicle) may be compared to the regions associated with the pumps of the station. In an example, a vehicle is associated with a pump if a substantial portion of the vehicle (e.g., a point of interest on the vehicle or more than half of the footprint of the vehicle) is inside the region associated with that pump, e.g., within a region defined specifically for the camera in which the vehicle is detected. The pump is assigned to the vehicle while the vehicle is stopped (e.g., remains unmoved for at least a period of time) and while a substantial portion of the vehicle is in the region. For example, if the vehicle moves to a position where a substantial portion of the vehicle is outside of the region or is in a different region, then a different pump may be assigned to the vehicle (or no pump may be assigned to the vehicle).

In example embodiments, at operation 1406, an authorization request is sent, for example, to obtain secondary authorization of the vehicle. The authorization request may be conditionally based on a geolocation of a device compared to a geofence of the station at which the vehicle is detected (at operation 1402). As further described herein, if a device is located at the same station as the vehicle, frictionless fueling and payment may proceed without express action by a user at the device. If, alternatively, a device is located remote from the station of the vehicle, then remote authorization of fueling a payment may proceed if express authorization is obtained at the device. Thus, sending of the authorization request for approval (e.g., as an example of secondary authorization) may occur only if the geolocation of the device is remote from the station (e.g., outside of a geofence associated with the station).

At operation 1408, fueling of the vehicle at the assigned pump is permitted. Permitting or allowing fueling of a vehicle at an assigned pump is also referred to herein as unlocking the assigned pump. Permission to fuel the using the assigned pump may be conditionally based on receiving an authorization (e.g., via frictionless fueling and payment or remote fueling and payment).

At operation 1410, a notification is sent. The notification may include a transaction receipt. The notification may be sent after determining that fueling of the vehicle at the assigned pump is complete, such as determining that the vehicle has moved, determining that the vehicle has moved outside of a region associated with the assigned pump, determining that a nozzle of a pump has been replaced, or any other indication that fueling is complete. The transaction receipt may include a variety of information related to the transaction, such as vehicle information, identification of the station, payment amount, etc.

Figure 14B:
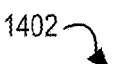
FIG. 14B depicts another example method for streamlined vehicle fueling and payment.

FIG. 14B depicts additional steps associated with operation 1402 described in FIG. 14A. At operation 1420, it is recognized when the vehicle is stopped for fueling. The vehicle is recognized as being stopped for fueling if the vehicle is stationary for a certain period of time. This may be determined based on analysis of a video stream capturing the vehicle's position in or around the station.

At operation 1422, a license plate of the vehicle is identified. The license plate may be identified based on a shape, position, color, or other distinguishing feature of a license plate relative to a vehicle. Identification of the license plate includes character recognition of a sequence of characters listed on the license plate to allow searching of the license plate in a database. At operation 1424, the license plate is looked up in a database. The database may include customer accounts or customer information associated with a license plate or other vehicle information. The database may include a list of license plates and associated customer accounts as provided by a customer (e.g., the customer gives permission to associate their account with vehicle information or the customer provides vehicle information for their customer account to the database).

At determination 1426, it is determined if the license plate is associated with a customer. If the license plate is not associated with a customer or a customer account, the method flows "NO" to operation 1428 where the streamlined fueling and payment process terminates (e.g., no frictionless or remotely authorized fueling or payment). Traditional fueling methods at the station and/or pump (e.g., requiring user interaction or action at the pump and/or station) are available.

If, alternatively, the license plate is determined to be associated with a customer or customer account, the method flows "YES" and continues to determination 1430, where it is determined if the customer's device is in a geofence associated with the station in which the vehicle is located. As further described herein, a geolocation of a device associated with the customer or customer account (e.g., a device logged in or active in a customer account) is compared with a geofence of the station to determine if the device is at the same location as the station or is remote from the station. If the customer's device is outside the geofence of the station (e.g., the device is remote from the station), the method flows "NO" to operation 1406 in FIG. 14A to acquire authorization from the customer. If, alternatively, the customer's device is inside the geofence of the station (e.g., the device is in a proximity to allow for frictionless fueling and payment), the method flows "YES" to operation 1408 of FIG. 14A to allow frictionless fueling of the vehicle at the assigned pump at the station.

Figure 15:
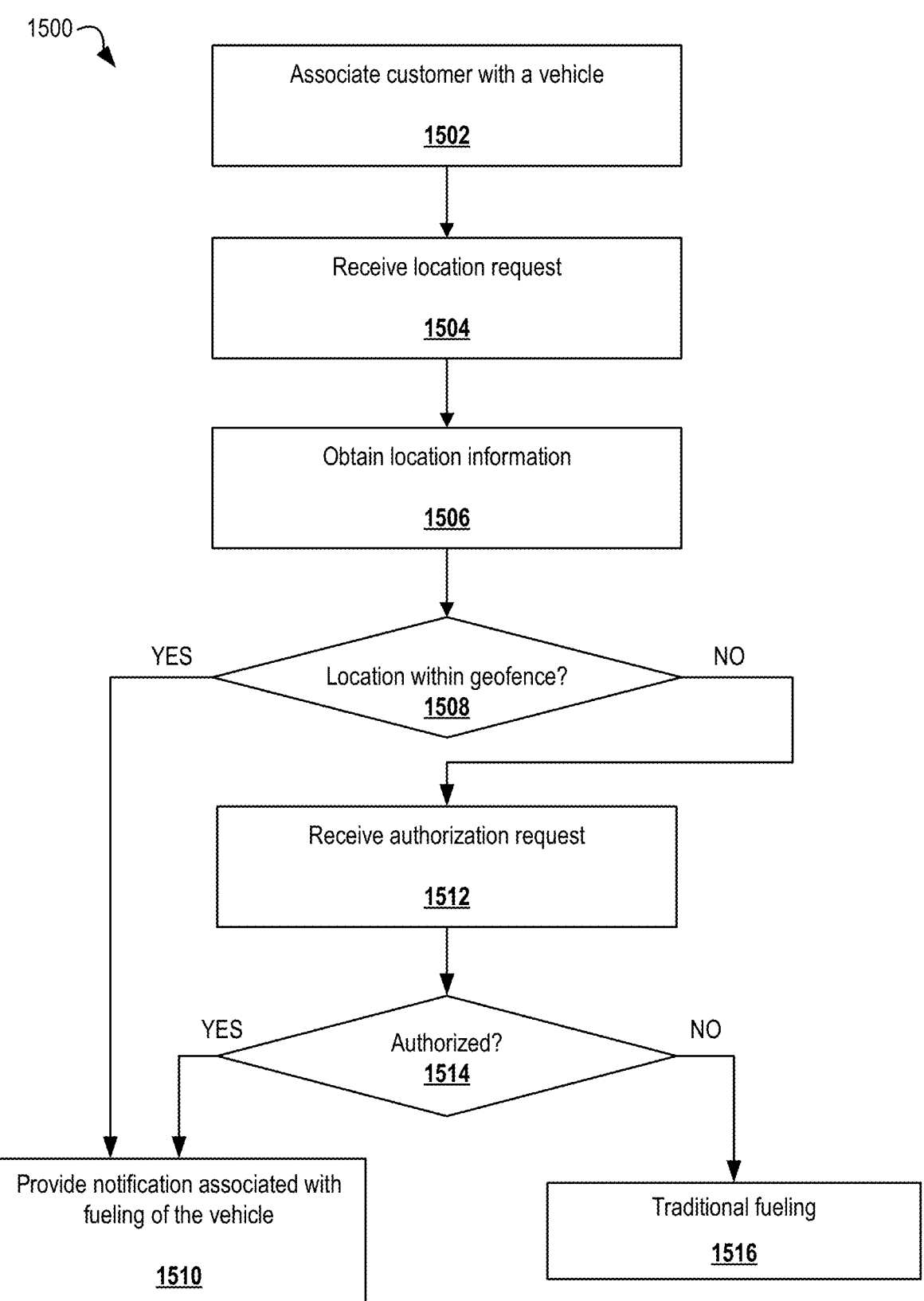
FIG. 15 depicts another example method for streamlined vehicle fueling and payment.

FIG. 15 depicts another example method 1500 for streamlined vehicle fueling and payment. At operation 1502, a customer is associated with a vehicle. As further described herein, the customer or a customer account may be associated with a vehicle when vehicle information is provided by the customer or at the customer account. As otherwise described herein, vehicle information may include a license plate number, a color of the vehicle, a make of the vehicle, a model of the vehicle, etc.

At operation 1504, a location request is received. The location request may be made by an application running on the device associated with a customer or a customer account. The location request calls for a geolocation of the device. The geolocation may be determined based on a GPS of the device, nearby networks of the device, an IP address of the device, manually provided at the device, etc. At operation 1506, location information is obtained. The location information may be obtained by an application running on the device that is associated with the customer or customer account.

At determination 1508, it is determined if the location is within a geofence. Determination 1508 may be similar to determination 1430, except the determination may be made by an application running on the device rather than by an on-site fueling system. If it is determined that the location of the device is within the geofence, the method flows "YES" to operation 1510 where a notification associated with fueling of the vehicle is provided. The notification may be provided by the application to a customer. The notification may be a transaction receipt received after carrying out a frictionless fueling and payment process.

If, alternatively, the location of the device is not determined to be within the geofence (e.g., the device is remote from the station, or the geofencing functionality is not active), the method 1500 flows "NO" to operation 1512 where an authorization request is received. The authorization request may be similar to operation 1406 of FIG. 14A, allowing for remote authorization by a customer at a customer account to allow remote fueling and payment for the vehicle at the station.

At determination 1514, it is determined if the authorization request is authorized. The authorization request may be authorized by a customer at an application of the device associated with the customer account. The authorization request may expire after a certain time period has lapse (e.g., 5 minutes, 10 minutes, 15 minutes, or any other time period, after receiving the request). A lapse in the authorization request may result in denial of authorization. Alternatively, a customer may provide an indication to authorize the fueling and payment remotely from the device at the application. If the request is authorized, the method 1500 flows "YES" to operation 1510 where a notification associated with the fueling of the vehicle is provided to the customer (e.g., via a transaction receipt). If, alternatively, the request is not authorized, the method 1500 flows "NO" to operation 1516 where traditional fueling is permitted (see operation 1428 in FIG. 14B).

Figure 16:
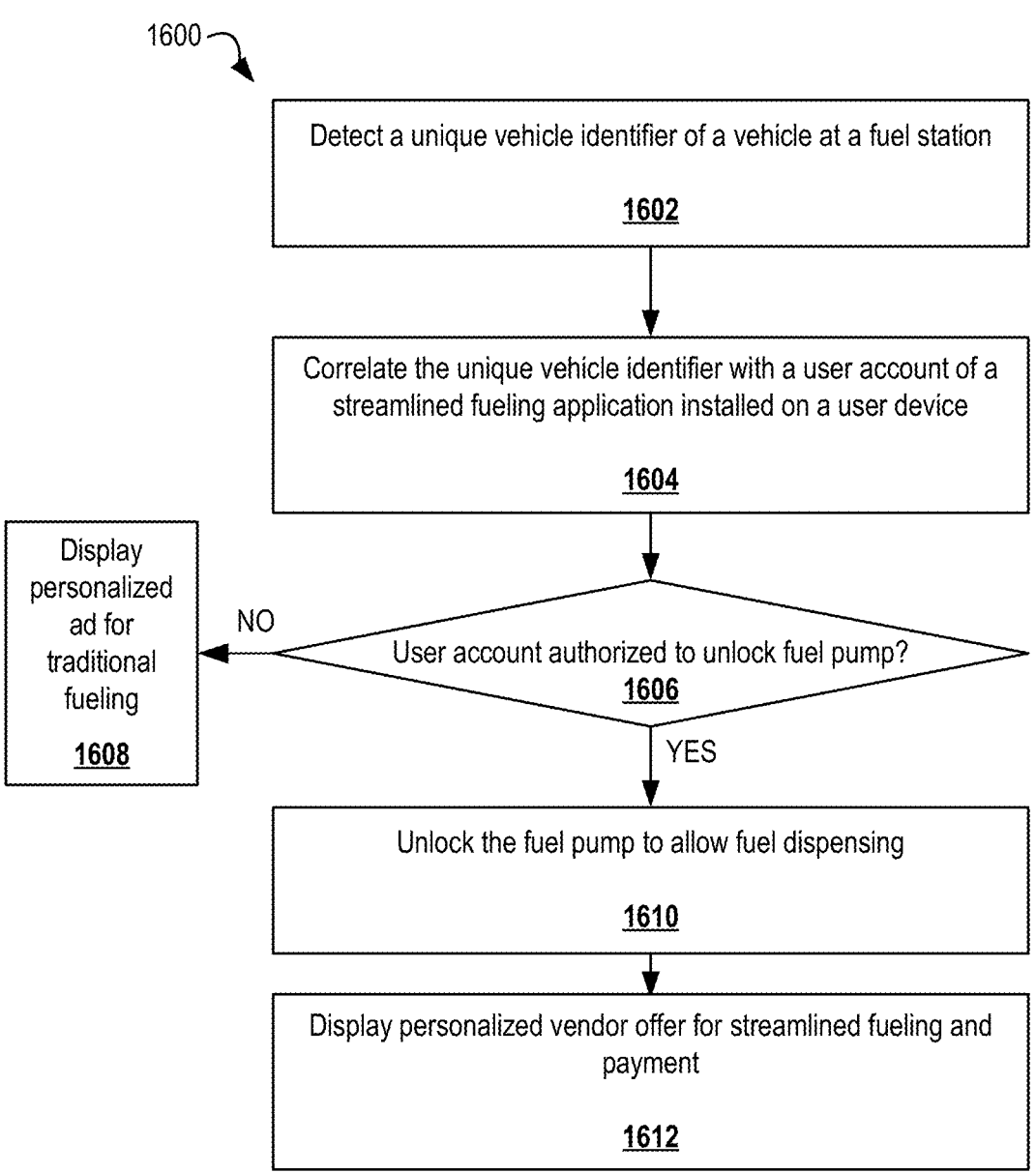
FIG. 16 depicts another example method for streamlined vehicle fueling and payment.

In example embodiments, the determination of whether the location is within a geofence, and the authorization request, represent examples of a secondary authorization. A secondary authorization may be an authorization obtained in addition to the identification of the vehicle via FIG. 16 depicts another example method 1600 for streamlined vehicle fueling and payment. At operation 1602, a unique vehicle identifier is detected for a vehicle at a fuel station. At operation 1604, the unique vehicle identifier is correlated with a user account of a streamlined fueling application installed on a user device. At operation 1604, it is determined whether the user account is authorized to unlock the fuel pump. If not (e.g., No at operation 1606), the method 1600 proceeds to operation 1608 to display a personalized ad for a traditional fueling operation. For instance, the advertisement may be provided to the fuel dispenser display but not include interactive elements for purchasing additional items. Otherwise (e.g., Yes at operation 1606), the method 1600 proceeds to operation 1610 to unlock the fuel pump to allow fuel dispensing. Additionally, at operation 1612, a personalized vendor offer is displayed for streamlined fueling and payment. For instance, the vendor offer may be provided to the user account/device or displayed on the fuel dispenser and include interactive elements for seamlessly purchasing additional items or offers that have been tailored or customized to the user's historical behavior data.

Referring to FIGS. 1-16 generally, the frictionless payment system described herein has a number of advantages over existing systems. For example, for pre-registered users, a coordinated video image analysis process, and proximity detection process, may be used to allow a customer to automatically obtain authorization of a pump, refuel, and pay for refueling without interacting with a payment system either at the pump or at a point of sale within a convenience store. Still further, for such users, payment may be affected without requiring interaction with a mobile device at all. This improves customer convenience, reduces customer physical interaction with payment systems (thereby improving cleanliness, and reducing spread of contact-based infection), and improves throughput of customers at a given refueling pump.

Still further, the frictionless payment system may readily be adapted to other types of transactions. Although specific embodiments are described herein, the scope of the technology is not limited to those specific embodiments. For example, although the disclosure describes examples associated with fueling a vehicle, charging of electric vehicles is also contemplated. Additionally, services beyond fueling of the vehicle, such as a car wash, detailing, pressurized air, etc. are contemplated by the present technology. Other activities may be used in conjunction with the frictionless payment system described herein, so long as a vehicle and user may be identified as associated with such a transaction. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. Further, as used herein and in the claims, the phrase "at least one of element A, element B, or element C" is intended to convey any of: element A, element B, element C, elements A and B, elements A and C, elements B and C, and elements A, B, and C. Further, one having skill in the art will understand the degree to which terms such as "about" or "substantially" convey in light of the measurements techniques utilized herein. To the extent such terms may not be clearly defined or understood by one having skill in the art, the term "about" shall mean plus or minus ten percent.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

What is claimed is:

1. A method for streamlined vehicle fueling and payment, the method comprising:

detecting that a vehicle is in proximity to a selected fuel pump from a plurality of fuel pumps of a fuel station, based on the vehicle appearing in one of a plurality of different predetermined regions of an image, said predetermined regions corresponding to different ones of the plurality of fuel pumps of the fuel station;

identifying vehicle information associated with the vehicle;

based on the vehicle information, determining that the vehicle is associated with a customer account;

determining a geolocation of a device associated with the customer account;

comparing the geolocation of the device with a geofence associated with the fuel station; and based on the geolocation of the device being located inside of the geofence associated with the fuel station, unlocking the selected fuel pump.

2. The method of claim 1, wherein the fuel pump is unlocked, at least in part, based on the geolocation of the device being located inside of the geofence associated with the fuel station.

3. The method of claim 2, wherein, based on the geolocation of the device being located inside of the geofence associated with the fuel station and the customer account being a preexisting customer account, the unlocking of the fuel pump does not require user interaction with the fuel pump.

4. The method of claim 1, wherein the method further comprises:

determining that the fuel pump is no longer in use for the vehicle;

locking the fuel pump; and sending a transaction receipt to the customer account.

5. The method of claim 1, wherein the vehicle information is selected from the group consisting of:

a license plate number;

a color of the vehicle;

a make of the vehicle; and a model of the vehicle.

6. The method of claim 5, wherein the vehicle information includes a license plate number, and wherein determining that the vehicle is associated with the customer account includes a lookup of the license plate number in a customer database.

7. The method of claim 1, wherein the device comprises a mobile phone.

8. The method of claim 1, wherein:

detecting that the vehicle is in proximity to the fuel pump includes identifying, via a camera positioned in proximity to the fuel station, that a vehicle is present within a predefined region within a field of view of the camera for at least a predetermined amount of time; and identifying vehicle information includes analyzing an image of a license plate obtained via the camera to identify a license plate number associated with the vehicle.

9. The method of claim 8, wherein the method further comprises:

determining that the vehicle has moved outside of the proximity of the fuel pump;

locking the fuel pump; and sending a transaction receipt to the customer account.

10. The method of claim 8, wherein unlocking the fuel pump includes allowing fuel to be provided to the vehicle via the fuel pump at the fuel station.

11. The method of claim 1, further comprising, after unlocking the fuel pump, providing personalized content to the fuel pump for display on a display of the fuel pump based, at least in part, on information associated with the customer account.

12. A method for streamlined vehicle fueling and payment, the method comprising:

detecting that a vehicle is in proximity to a fuel pump of a fuel station;

identifying vehicle information associated with the vehicle;

based on the vehicle information, determining that the vehicle is associated with a customer account;

requesting secondary authorization to unlock the fuel pump, the secondary authorization including:

determining a geolocation of a device associated with the customer account; and comparing the geolocation of the device with a geofence associated with the fuel station; and based on obtaining the secondary authorization, unlocking the fuel pump based, at least in part, on the geolocation of the device being located inside of the geofence associated with the fuel station, and wherein obtaining the secondary authorization includes:

based on the geolocation of the device being located outside of the geofence associated with the fuel station, sending an authorization request to the customer account; and receiving a remote authorization via the customer account, wherein the fuel pump is unlocked, at least in part, based on receiving the remote authorization and without user interaction with the fuel pump.

13. The method of claim 12, wherein the authorization request includes the vehicle information and identifies the fuel station, and wherein the vehicle information is a license plate number of the vehicle.

14. The method of claim 12, wherein the customer account includes payment information.

15. A method for streamlined vehicle fueling and payment, the method comprising:

in response to receiving authorization from a user, associating vehicle information for a vehicle with a customer account by capturing vehicle information with a camera and automatically updating the customer account to include the obtained vehicle information;

receiving a location request for a device associated with the customer account;

obtaining a geolocation of the device;

comparing the geolocation of the device with a geofence of a fuel station at which the vehicle has been identified based on the vehicle information;

determining a fueling pump of a plurality of fueling pumps at the fuel station associated with the vehicle based on the vehicle appearing in one of a plurality of different predetermined regions of an image captured with a camera system at the fuel station;

determining that fueling of the vehicle at the fuel station is authorized by the customer account; and providing a transaction receipt for the authorized fueling of the vehicle at the fueling pump of the fuel station.

16. The method of claim 15, wherein determining that fueling of the vehicle at the fuel station is authorized by the customer account includes:

determining that the geolocation of the device is inside of the geofence of the fuel station.

17. The method of claim 15, wherein determining that fueling of the vehicle at the fuel station is authorized by the customer account includes:

providing an authorization request to the customer account; and receiving a remote authorization for the customer account at the device.

18. The method of claim 15, further comprising:

in response to determining that the fueling of the vehicle at the fuel station is authorized by the customer account, processing a customer profile associated with the customer account to determine personalized content to provide to the customer account during fueling.

19. The method of claim 15, wherein the transaction receipt includes a payment amount and identifies the fuel station.

20. A system comprising:

a fuel station comprising a plurality of fuel pumps;

a camera network having a plurality of cameras positioned at the fuel station, each camera having a field of view, wherein, within the field of view of each of one or more of the plurality of cameras, a region is defined corresponding to a vehicle position in association with a predetermined one of the plurality of fuel pumps;

a geolocation service defining a geofence in a vicinity of the fuel station;

a customer profile database maintained in communicative connection with the camera network, the customer profile database storing customer account information associated with a plurality of customer accounts, the customer account information including payment information and vehicle information, the vehicle information including at least a license plate number associated with a vehicle;

a fueling control system including a streamlined fueling controller and at least one content controller, the fueling control system configured to:

determine, from the camera network that a vehicle is in proximity to a fuel pump of a fuel station;

identify vehicle information associated with the vehicle;

based on the vehicle information, determining that the vehicle is associated with a customer account maintained in the customer profile database;

request secondary authorization to unlock the fuel pump, the secondary authorization including at least one of (1) confirmation of a geolocation of a device associated with the customer account within the geofence at the fuel station, or (2) an authorization received from a customer associated with the customer account;

based on obtaining the secondary authorization, unlock the fuel pump without requiring user interaction with the fuel pump;

after unlocking the fuel pump, providing personalized content to the fuel pump for display on a display of the fuel pump based, at least in part, on information associated with the customer account; and upon completion of a fueling transaction, providing a transaction receipt for authorized fueling of the vehicle at the fuel station.

* * * * *